United States Patent
Im et al.

(10) Patent No.: US 11,941,920 B2
(45) Date of Patent: Mar. 26, 2024

(54) APPARATUS AND METHOD OF PROVIDING AUTOMOTIVE PREVENTIVE MAINTENANCE SERVICE

(71) Applicant: GLOBIZ CO., LTD., Seoul (KR)

(72) Inventors: Jun Sik Im, Seoul (KR); Jong Soon Im, Seoul (KR)

(73) Assignee: GLOBIZ CO., LTD., Seoul (KR)

( * ) Notice: Subject to any disclaimer, the term of this patent is extended or adjusted under 35 U.S.C. 154(b) by 587 days.

(21) Appl. No.: 16/727,641

(22) Filed: Dec. 26, 2019

(65) Prior Publication Data

US 2021/0201598 A1 Jul. 1, 2021

(51) Int. Cl.
*G07C 5/00* (2006.01)
*G06Q 10/30* (2023.01)
(Continued)

(52) U.S. Cl.
CPC ............ *G07C 5/006* (2013.01); *G06Q 10/30* (2013.01); *G06Q 30/0631* (2013.01); *G07C 5/008* (2013.01); *G07C 5/0808* (2013.01)

(58) Field of Classification Search
CPC ...... G07C 5/006; G07C 5/008; G07C 5/0808; G06Q 10/30; G06Q 10/0631
See application file for complete search history.

(56) References Cited

U.S. PATENT DOCUMENTS

| | | | | |
|---|---|---|---|---|
| 2003/0114965 A1* | 6/2003 | Fiechter | ............ | G05B 23/0243 714/E11.158 |
| 2008/0177437 A1* | 7/2008 | Asgari | ................ | B60W 50/045 701/33.9 |

(Continued)

FOREIGN PATENT DOCUMENTS

| | | |
|---|---|---|
| KR | 10-2006-0008401 A | 1/2006 |
| KR | 10-1053722 B1 | 8/2011 |
| KR | 10-1127625 B1 | 3/2012 |
| KR | 10-2012-0053429 A | 5/2012 |
| KR | 10-1683242 B1 | 12/2016 |
| KR | 101683242 B1 * | 12/2019 |

OTHER PUBLICATIONS

Korean Office Action for related KR Application No. 10-2018-0058722 dated May 20, 2019 from Korean Intellectual Property Office.

*Primary Examiner* — Truc M Do
(74) *Attorney, Agent, or Firm* — Paratus Law Group, PLLC

(57) ABSTRACT

An apparatus for providing an automotive preventive maintenance service includes: a vehicle information creator that creates vehicle information including vehicle diagnosis information obtained in real time while a vehicle is driven and vehicle state information showing a current state of the vehicle; a vehicle breakdown generation predictor that creates vehicle part states each composed of a preventive maintenance emergency degree and a vehicle part on the basis of the vehicle information, and predicts breakdown generation of the vehicle; an automotive repair shop recommender that recommends an automotive repair shop based on a cost or a distance on the basis of the preventive maintenance emergency degree in at least one of the vehicle part states; and a preventive maintenance service compensator that detects whether to perform a maintenance service about a corresponding vehicle part state according to the preventive maintenance emergency degree, and provides preventive maintenance service compensation.

11 Claims, 14 Drawing Sheets

(51) Int. Cl.
*G06Q 30/0601* (2023.01)
*G07C 5/08* (2006.01)

(56) References Cited

U.S. PATENT DOCUMENTS

2016/0025813 A1* 1/2016 Semanson ............. H02J 7/0091
    374/102
2016/0133070 A1* 5/2016 Ikeda ................... G07C 5/0808
    701/31.4
2017/0076514 A1* 3/2017 Valeri .................... G05B 23/00
2019/0130669 A1* 5/2019 Boggio ................ G07C 5/0825
2020/0043258 A1* 2/2020 Jiang ................... G07C 5/0825

\* cited by examiner

FIG. 5
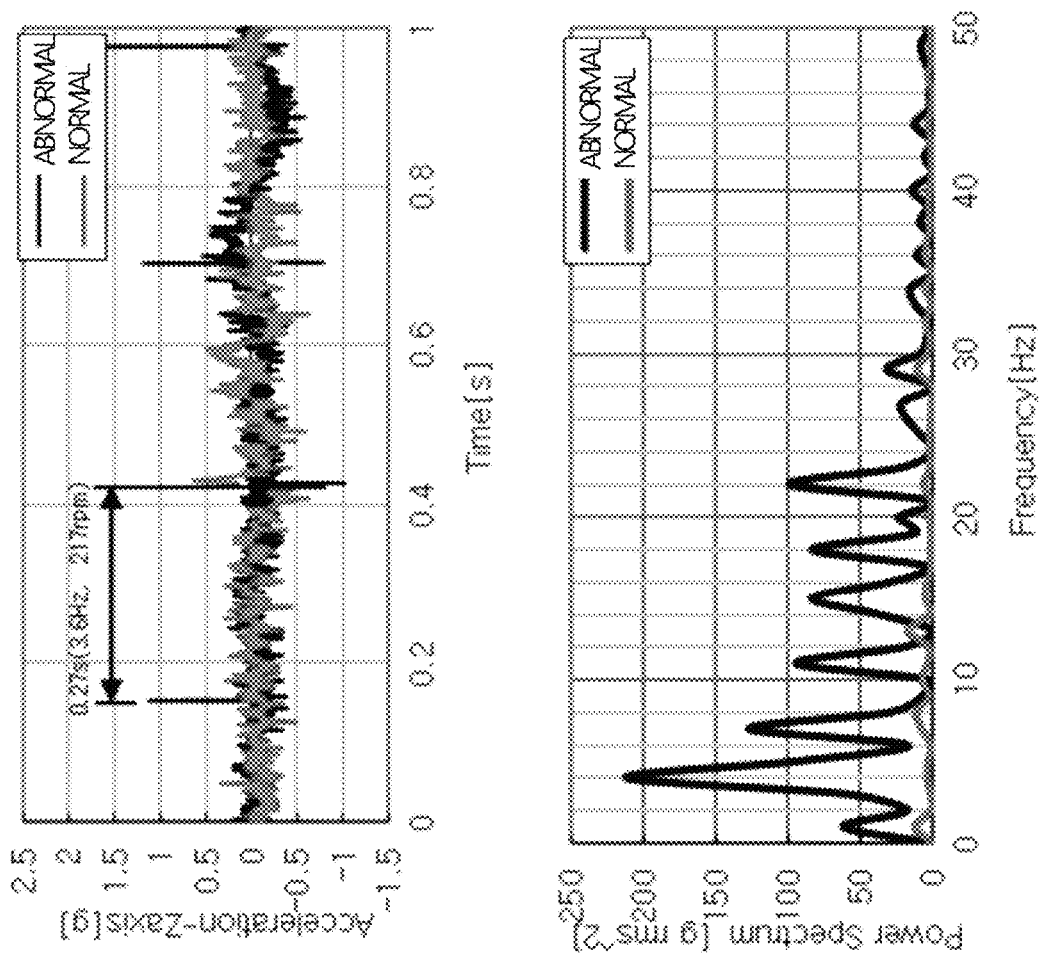
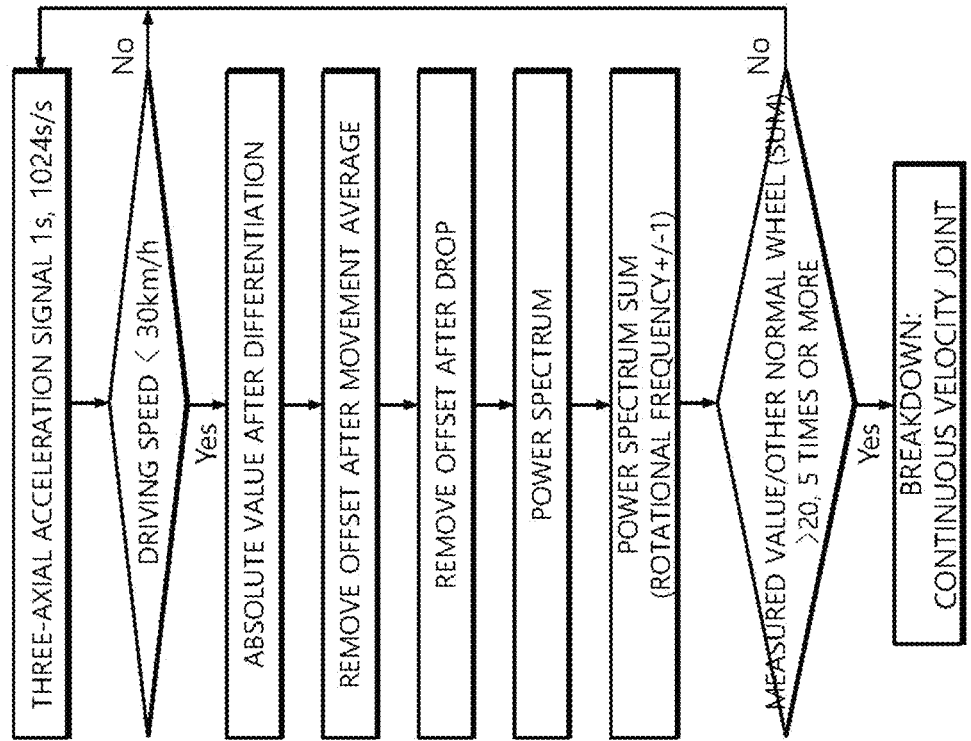

FIG. 8

| OVERWORK CONDITION | ANALYSIS SENSOR | SPECIFIC WEIGHT | DRIVING DISTANCE | DRIVING TIME | CONTRIBUTION DEGREE(%) | OVERWORK DEGREE(%) |
|---|---|---|---|---|---|---|
| 1. WHEN REPEATEDLY DRIVING SHORT DISTANCE | VEHICLE SPEED, CAR BODY ACCELERATION, WHEEL SPEED SENSOR, WHEEL ACCELERATION SENSOR, GPS, VEHICLE POWER | W1 | M1 | T1 | C1 | S1 |
| 2. WHEN DRIVING AREA WITH LOT OF SAND AND DUST | VEHICLE SPEED, CAR BODY ACCELERATION, WHEEL SPEED SENSOR, WHEEL ACCELERATION SENSOR | W2 | M2 | T2 | C2 | S2 |
| 3. WHEN CONTINUOUSLY EXCESSIVE IDLING | VEHICLE SPEED, CAR BODY ACCELERATION, WHEEL SPEED SENSOR, GPS, WHEEL ACCELERATION SENSOR | W3 | M3 | T3 | C3 | S3 |
| 4. WHEN DRIVING OVER 50% OF AREA WITH HEAVY CONGESTION AT TEMPERATURE OVER 30 C | VEHICLE SPEED, CAR BODY ACCELERATION, WHEEL SPEED SENSOR, GPS, WHEEL ACCELERATION SENSOR, TEHMPERATURE SENSOR | W4 | M4 | T4 | C4 | S4 |
| 5. WHEN FREQUENTLY DRIVING ROUGH ROAD (SAND/GRAVEL ROAD, SNOWY ROAD, NON-PAVED ROAD) ETC. | VEHICLE SPEED, CAR BODY ACCELERATION, WHEEL SPEED SENSOR, GPS, WHEEL ACCELERATION SENSOR | W5 | M5 | T5 | C5 | S5 |
| 6. WHEN FREQUENTLY DRIVING MOUNTAIN PATH, UPHILL/DOWNHILL | VEHICLE SPEED, CAR BODY ACCELERATION, GPS, CAR BODY INCLINATION SENSOR, WHEEL SPEED SENSOR, WHEEL ACCELERATION SENSOR | W6 | M6 | T6 | C6 | S6 |
| 7. WHEN USING AS POLICE CAR, TAXI, COMMERCIAL CAR, TOW TRUCK, ETC. | VEHICLE SPEED, CAR BODY ACCELERATION, WHEEL SPEED SENSOR, GPS, WHEEL ACCELERATION SENSOR | W7 | M7 | T7 | C7 | S7 |
| 8. WHEN FREQUENTLY DRIVING AT HIGH SPEED (170KM/H) | VEHICLE SPEED, CAR BODY ACCELERATION, WHEEL SPEED SENSOR, GPS | W8 | M8 | T8 | C8 | S8 |
| 9. WHEN FREQUENTLY REPEATING STOP AND START | VEHICLE SPEED, CAR BODY ACCELERATION, WHEEL SPEED SENSOR, GPS, WHEEL ACCELERATION SENSOR | W9 | M9 | T9 | C9 | S9 |
| 10. WHEN DRIVING SALTY AREA, CORROSIVE AREA, OR COLD AREA | VEHICLE SPEED, CAR BODY ACCELERATION, WHEEL SPEED SENSOR, GPS, WHEEL ACCELERATION SENSOR, TEHMPERATURE SENSOR | W10 | M10 | T10 | C10 | S10 |

FIG. 9

| OVERWORK CONDITION | ANALYSIS SENSOR | SPECIFIC WEIGHT | DRIVING DISTANCE | DRIVING TIME | CONTRIBUTION DEGREE(%) | OVERWORK DEGREE(%) |
|---|---|---|---|---|---|---|
| 1. WHEN REPEATEDLY DRIVING SHORT DISTANCE | VEHICLE SPEED, CAR BODY ACCELERATION, WHEEL SPEED SENSOR, WHEEL ACCELERATION SENSOR, GPS, VEHICLE POWER | 1 | M1 | T1 | 1-DP, UNDER 100M 100, 100000이상 0 | S1 |
| 2. WHEN DRIVING AREA WITH LOT OF SAND AND DUST | VEHICLE SPEED, CAR BODY ACCELERATION, WHEEL SPEED SENSOR, WHEEL ACCELERATION SENSOR | 1 | M2 | T2 | 1-DP, UNPAVED ROAD 100, DESERT 90 | S2 |
| 3. WHEN CONTINUOUSLY EXCESS VE IDLING | VEHICLE SPEED, CAR BODY ACCELERATION, WHEEL SPEED SENSOR, GPS, WHEEL ACCELERATION SENSOR | 3 | M3 | T3 | 1-DP, IDLING 100 | S3 |
| 4. WHEN DRIVING OVER 50% OF AREA WITH HEAVY CONGESTION AT TEMPERATURE OVER 30 C | VEHICLE SPEED, CAR BODY ACCELERATION, WHEEL SPEED SENSOR, GPS, WHEEL ACCELERATION SENSOR, TEHMPERATURE SENSOR | 2 | M4 | T4 | 2-DP, TEMPERATURE>32, 100 & AVERAGE SPEED PER HOUR<10km/h :100, 50: 0 | S4 |
| 5. WHEN FREQUENTLY DRIVING ROUGH ROAD (SAND/GRAVEL ROAD, SNOWY ROAD, NON-PAVED ROAD) ETC. | VEHICLE SPEED, CAR BODY ACCELERATION, WHEEL SPEED SENSOR, GPS, WHEEL ACCELERATION SENSOR | 3 | M5 | T5 | 2-DP, CAR BODY VIBRATION rms>0.5g, 100; rms<0.2, 0; SLIP RATE>0.2, 100; SLIP RATE<0.05, 0 | S5 |
| 6. WHEN FREQUENTLY DRIVING MOUNTAIN PATH, UPHILL/DOWNHILL | VEHICLE SPEED, CAR BODY ACCELERATION, GPS, CAR BODY INCLINATION SENSOR, WHEEL SPEED SENSOR, WHEEL ACCELERATION SENSOR | 2 | M6 | T6 | 1-DP, CAR BODY PITCH ANGLE>30 DEGREE, 100 CAR BODY PITCH ANGLE<5 DEGREE, 0 | S6 |
| 7. WHEN USING AS POLICE CAR, TAXI, COMMERCIAL CAR, TOW TRUCK, ETC. | VEHICLE SPEED, CAR BODY ACCELERATION, WHEEL SPEED SENSOR, GPS, WHEEL ACCELERATION SENSOR | 1 | M7 | T7 | 1-DP, COMMERCIAL VEHICLE USE MADE 100 | S7 |
| 8. WHEN FREQUENTLY DRIVING AT HIGH SPEED (170KM/H) | VEHICLE SPEED, CAR BODY ACCELERATION, WHEEL SPEED SENSOR, GPS | 1 | M8 | T8 | 1-DP, HIGH-SPEED DRIVING OVER 200 100 HIGH-SPEED DRIVING LESS THAN 80 0 | S8 |
| 9. WHEN FREQUENTLY REPEATING STOP AND START | VEHICLE SPEED, CAR BODY ACCELERATION, WHEEL SPEED SENSOR, GPS, WHEEL ACCELERATION SENSOR | 1 | M9 | T9 | 1-DP, 1 TIME/10m 100, 1TIME OVER 1000M 100 | S9 |
| 10. WHEN DRIVING SALTY AREA, CORROSIVE AREA, OR COLD AREA | VEHICLE SPEED, CAR BODY ACCELERATION, WHEEL SPEED SENSOR, GPS, WHEEL ACCELERATION SENSOR, TEHMPERATURE SENSOR | 1 | M10 | T10 | 2-DP, Temp.<-5, COAST: 100, 1TIME UNDER 10: 0; 1TIME OVER 1000: 0 | S10 |

FIG. 10

| ITEM | | VEHICLE A | | VEHICLE B | | VEHICLE C | |
|---|---|---|---|---|---|---|---|
| | | ACCELERATION CONDITION Ms, Ts | COMMON CONDITION Mn, Tn | ACCELERATION CONDITION Ms, Ts | COMMON CONDITION Mn, Tn | ACCELERATION CONDITION Ms, Ts | COMMON CONDITION Mn, Tn |
| ENGINE OIL & OIL FILTER | GASOLINE / LPI | EVERY 7,500km OR 6MONTH | EVERY 15,000km REPLACEMENT 1YEAR | EVERY 7,500km OR 6MONTH | EVERY 15,000km OR 1YEAR | EVERY 7,500km OR 6MONTH REPLACEMENT | EVERY 15,000km REPLACEMENT 1YEAR |
| | DIESEL | EVERY 10,000km OR 6MONTH | EVERY 20,000km REPLACEMENT 1YEAR | | | EVERY 10,000km OR 6MONTH REPLACEMENT | EVERY 20,000km REPLACEMENT 1YEAR |
| AIR CLEANER FILTER | | 7,500km REPLACEMENT (GM) | EVERY 40,000km REPLACEMENT | EVERY 20,000km REPLACEMENT | EVERY 40,000km REPLACEMENT | ANYTIME EXAMINATION OR EVERY 20,000km | EVERY 40,000km REPLACEMENT |
| IGNITION PLUG | NICKEL | 20,000km (COMMON CONDITION 1/2) | EVERY 40,000km REPLACEMENT | | | ANYTIME EXAMINATION | EVERY 40,000km (GASOLINE) REPLACEMENT |
| TIMING BELT | | 80,000km (COMMON CONDITION 1/2) | EVERY 160,000km REPLACEMENT | 80,000km (COMMON CONDITION 1/2) | EVERY 160,000km REPLACEMENT | EVERY 50,000km ANYTIME EXAMINATION | EVERY 160,000km (LPI) REPLACEMENT |
| BRAKE DISC PAD | | ANYTIME EXAMINATION | EVERY 10,000km EXAMINATION | ANYTIME EXAMINATION | EVERY 10,000km EXAMINATION | ANYTIME EXAMINATION | EVERY 10,000km EXAMINATION |
| LOWER ARM BALL JOINT CLEANED | | ANYTIME EXAMINATION | EVERY 30,000km EXAMINATION | ANYTIME EXAMINATION | EVERY 30,000km EXAMINATION | ANYTIME EXAMINATION | EVERY 30,000km EXAMINATION |
| DRIVE SHAFT & BOOT | | ANYTIME EXAMINATION | EVERY 10,000km EXAMINATION | ANYTIME EXAMINATION | EVERY 10,000km EXAMINATION | ANYTIME EXAMINATION | EVERY 10,000km EXAMINATION |
| AIR FILTER FOR AIR CONDITIONER | | ANYTIME EXAMINATION OR 7,500km REPLACEMENT | 15,000km REPLACEMENT | ANYTIME EXAMINATION OR 7,500km REPLACEMENT | 15,000km REPLACEMENT | ANYTIME EXAMINATION OR 7,500km REPLACEMENT | 15,000km REPLACEMENT |
| REAR DIFFERENTIAL OIL | | | | | | EVERY 120,000km | 240,000km |
| TRANSFER CASE(4WD) | | | | | | EVERY 120,000km | EVERY 240,000km |
| AUTOMATIC TRANSMISSION OIL | | EVERY 100,000km REPLACEMENT | EVERY 200,000km REPLACEMENT | EVERY 100,000km REPLACEMENT | EVERY 200,000km REPLACEMENT | EVERY 100,000km REPLACEMENT | EVERY 300,000km REPLACEMENT |

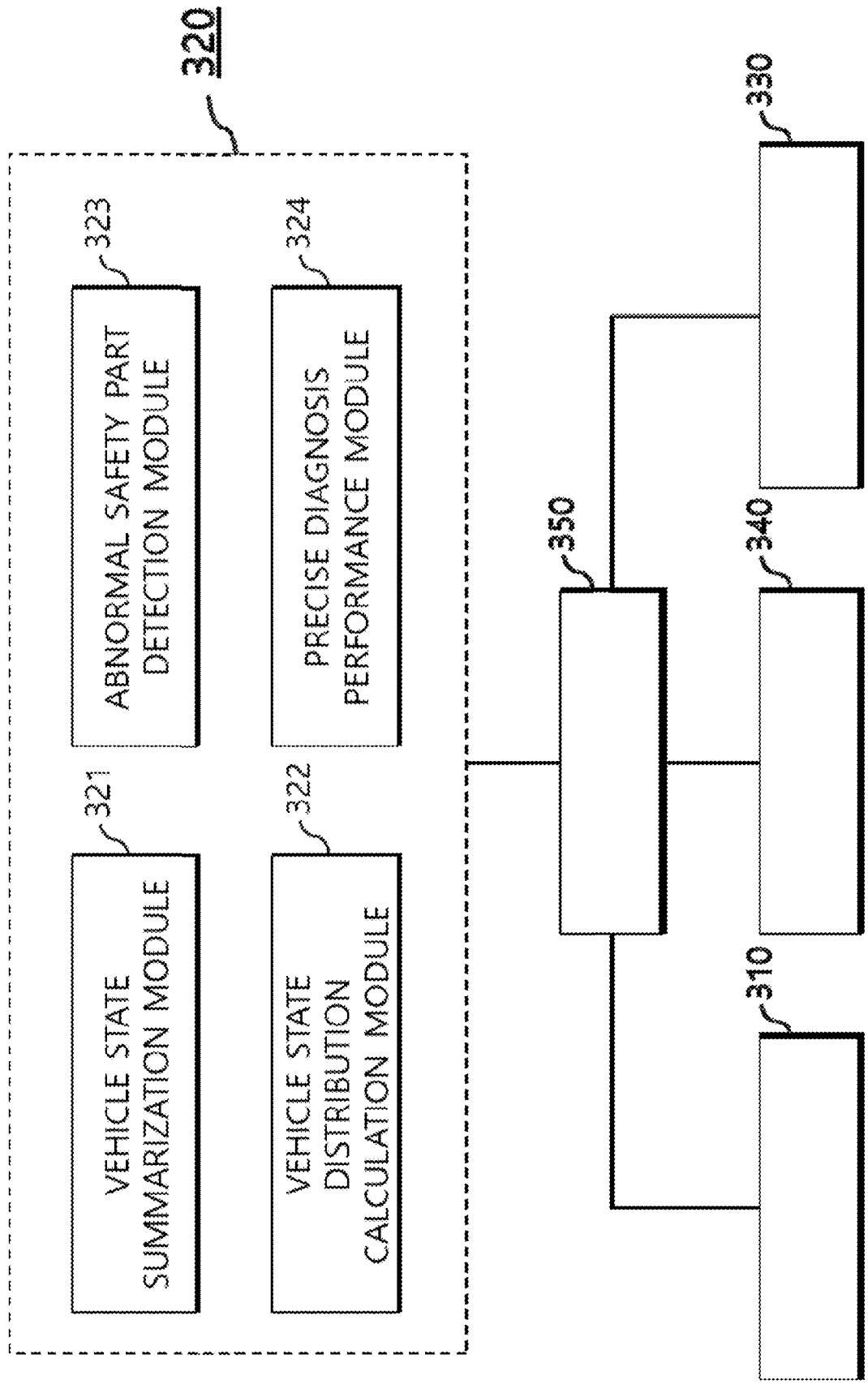

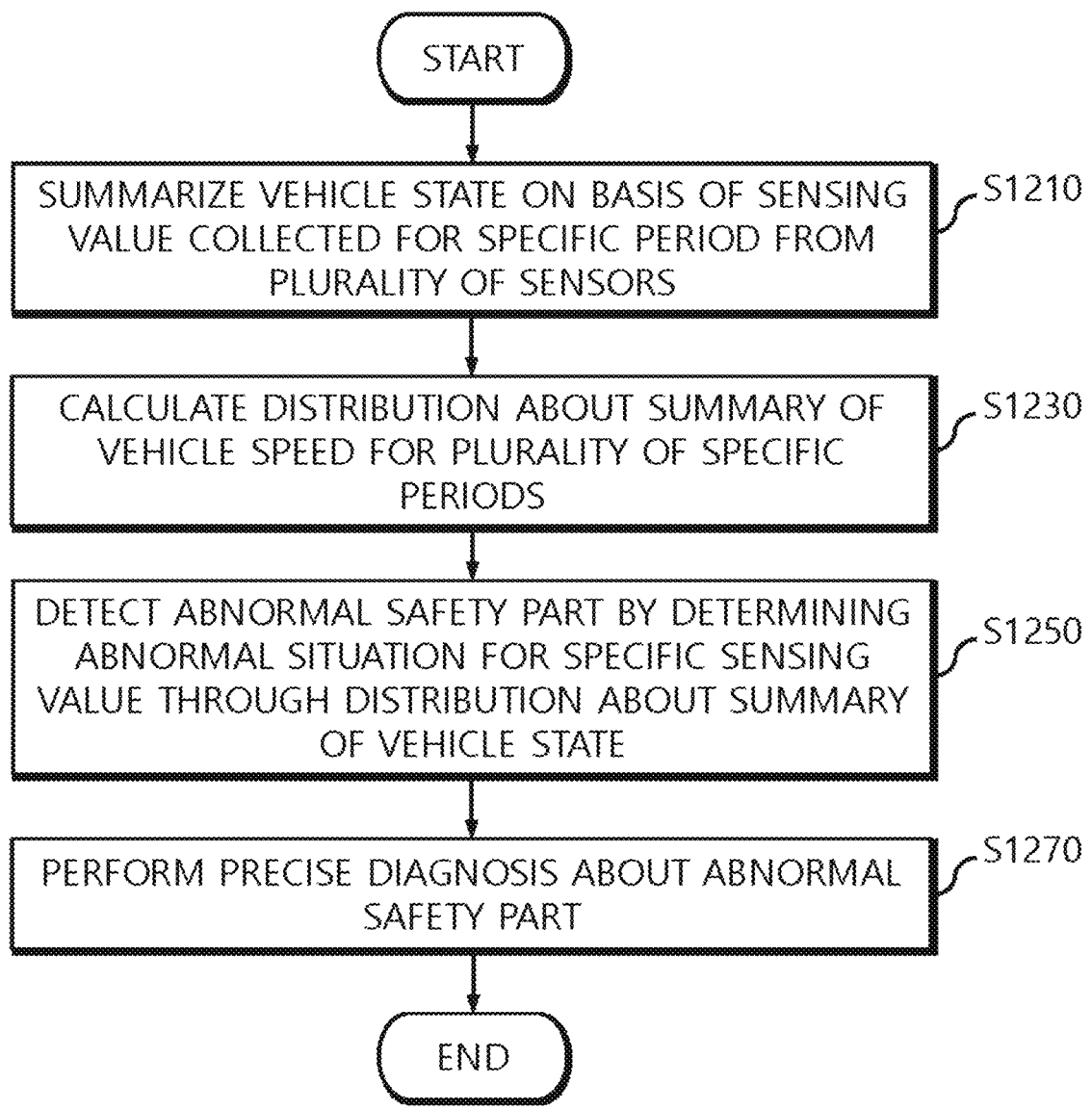

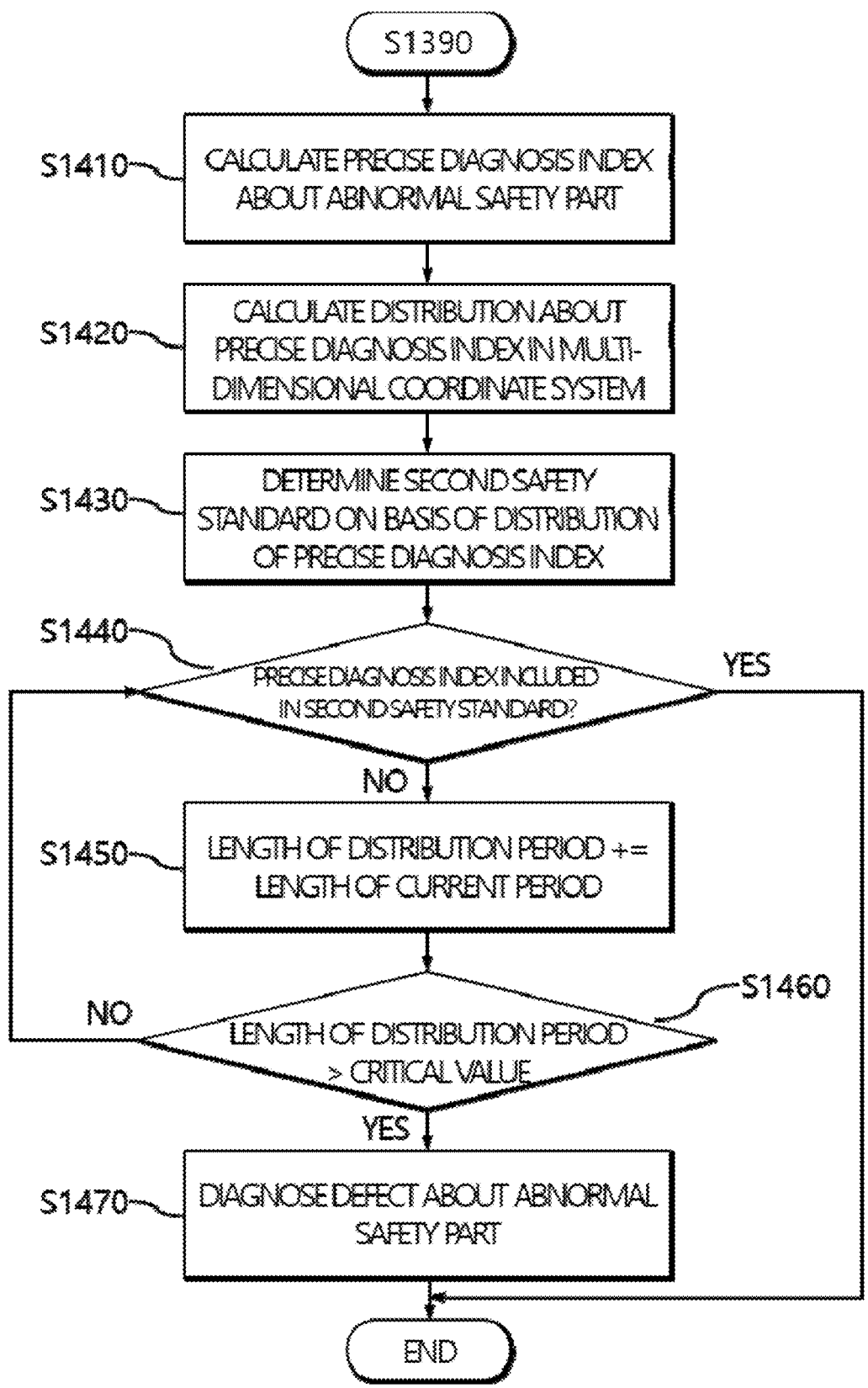

APPARATUS AND METHOD OF PROVIDING AUTOMOTIVE PREVENTIVE MAINTENANCE SERVICE

BACKGROUND

Field of the Invention

The present disclosure relates to providing an automotive preventive maintenance service and, more particularly, to an apparatus and method of providing an automotive preventive maintenance service, the apparatus and method preventively maintaining automotive parts by creating and using diagnosis information of a vehicle.

Related Art

Vehicles including a car and machines continuously operate parts and decrease in durability in driving processes for their functions. Accordingly, the parts of vehicles and machines are worn with different degrees, depending on the kinds and the functions, and should be replaced and repaired, if necessary.

However, what parts are damaged due to a decrease in durability depends on the environments of vehicles and machines, so the parts are replaced and repaired by collectively setting a driving distance or time.

However, since the driving environments of vehicles and machines are different, a breakdown is caused by indifference of a user who does not know damage to a part or a damage state of a part and does not recognize importance of replacement before collective replacement time, which causes an accident including a loss of life and a physical damage and results in a massive social loss.

As one method for preventing such a loss and damage, a study and development for increasing satisfaction of drivers by maintaining durability and driving stability by preventing damage to parts by replacing consumables and parts at appropriate time is in progress.

Korean Patent No. 10-1127625 relates to a system for informing of car maintenance schedule that stores a preventive maintenance list according to the characteristics of vehicles in a server 330 and provides a preventive maintenance list in accordance with the car type, model year, and mileage of a user's vehicle in response to a request from the user connected through the internet. The system includes: an input terminal 300 that is installed at an automotive repair shop having a membership, receives the car type, model year, and maintenance history of a vehicle maintained at the automotive repair shop and transmits the information to the server 330; a maintenance history database 400 that operates with the server 300 and stores maintenance histories for car types and model years input through the input terminal 300; and a statistical module 500 that is installed in the server 330, and crates and stores a preventive list according to car ages or a mileages for the car types and model years by collecting statistics of the maintenance histories for the car types and model years from the information stored in the maintenance history database 400.

Korean Patent No. 10-1053722 relates to an auto checking system of a car using telematics and method thereof. The auto checking system of a car using telematics includes: a plurality of electronic control units (ECU) that receives sensing signals from various sensors and generates diagnosis codes corresponding to whether there is a problem with parts of a vehicle on the basis of the sensing signals; an auto-diagnosis interface that stores data about whether there is a problem with diagnosis target items transmitted through the electronic control units (ECU); and a telematics device that is connected with the auto-diagnosis interface device through a predetermined communication line and displays in real time diagnosis information according to received data to a driver. According to the present disclosure, there is the advantage that a driver can check the state of a vehicle in real time while driving, so the driver can easily prepare against an accident in advance. Further, there is the advantage that even a new driver can easily check the state of a vehicle through a monitor and can check the state of the vehicle in real time, so it is possible to remove the burden that a driver has to go to an automotive repair shop and receive a maintenance service at all times.

PRIOR ART DOCUMENT

Patent Document

Korean Patent No. 10-1127625 (registered on 2012.03.09)
Korean Patent No. 10-1053722 (registered on 2011.07.27)

SUMMARY

An embodiment of the present disclosure provides an apparatus and method of providing an automotive preventive maintenance service, the apparatus and method predicting vehicle breakdown generation by generating a current state of a vehicle and current state information and checking an automotive part state.

An embodiment of the present disclosure provides an apparatus and method of providing an automotive preventive maintenance service, the apparatus and method recommending an automotive repair shop on the basis of a preventive maintenance emergency degree in accordance with an automotive part state.

An embodiment of the present disclosure provides an apparatus and method of providing an automotive preventive maintenance service, the apparatus and method providing a preventive maintenance bonus in accordance with automotive maintenance at an automotive repair shop on the basis of a preventive maintenance emergency degree in accordance with an automotive part state.

In embodiments, an apparatus for providing an automotive preventive maintenance service includes: a vehicle information creator that creates vehicle information including vehicle diagnosis information obtained in real time while a vehicle is driven and vehicle state information showing a current state of the vehicle; a vehicle breakdown generation predictor that creates vehicle part states each composed of a preventive maintenance emergency degree and a vehicle part on the basis of the vehicle information, and predicts breakdown generation of the vehicle; an automotive repair shop recommender that recommends an automotive repair shop based on a cost or a distance on the basis of the preventive maintenance emergency degree in at least one of the vehicle part states; and a preventive maintenance service compensator that detects whether to perform a maintenance service about a corresponding vehicle part state according to the preventive maintenance emergency degree, and provides preventive maintenance service compensation.

The vehicle information creator may create the vehicle diagnosis information by diagnosing the vehicle part on the basis of a complex vibration signal received from a vehicle vibration sensor, and may take a vehicle state received from a vehicle ECU (Electronic Control Unit) as the vehicle state information.

The vehicle information creator may diagnose the vehicle part by specifying one of at least one vehicle part related to the vehicle vibration sensor on the basis of a frequency band of the complex vibration signal.

The vehicle breakdown generation predictor may detect first abnormality of the vehicle part from the vehicle state information.

When abnormality of the vehicle part is not detected, the vehicle breakdown generation predictor may determine the preventive maintenance emergency degree by estimating the state of the vehicle part from the vehicle diagnosis information.

The vehicle breakdown generation predictor may determine an aging degree of the vehicle part in accordance with the state of the vehicle part, and may determine the preventive maintenance emergency degree on the basis of an aging degree to a lifespan cycle of the vehicle part.

The vehicle breakdown generation predictor may determine the preventive maintenance emergency degree by determining a vibration abnormality degree of the vehicle part in accordance with the state of the vehicle part.

The vehicle breakdown generation predictor may summarize a vehicle state on the basis of sensing values collected for a specific period from a plurality of sensors installed in the vehicle, may calculate distribution about summary of a vehicle state for a plurality of specific periods, may determine an abnormal situation about a specific sensing value through the distribution about the summary of the vehicle state, and may predict the breakdown generation by performing precise diagnosis about the abnormal safety part.

The vehicle breakdown generation predictor may summarize the vehicle state by calculating index values for a plurality of diagnosis items constituting the vehicle state using the sensing values collected for the specific period, may create a multi-dimensional coordinate system composed of coordinate axes respectively corresponding to the plurality of diagnosis items, and may calculate distribution about a plurality of index values for the plurality of specific periods in the multi-dimensional coordinate system.

The vehicle breakdown generation predictor may determine first safety standards for the coordinate axes on the basis of the distribution about the plurality of index values in the multi-dimensional coordinate system, and when there is an index value being out of the first safety standards and index values related to the coordinate axis and being out of the first safety standards are distributed in a predetermined number of continuous specific periods, the vehicle breakdown generation predictor may determine a safety part related to a diagnosis item corresponding to the coordinate axis as the abnormal safety part.

The vehicle breakdown generation predictor may calculate a precise diagnosis index through any one of envelope analysis and FFT (Fast Fourier Transform) on the basis of sensing values collected for the specific period for the sensors related to the abnormal safety part, may determine second safety standards on the basis of the precise diagnosis index for the plurality of specific periods, and may diagnose a defect of the abnormal safety part when the precise diagnosis index repeatedly exceeds the second safety standards for a specific number of continuous specific periods by comparing the second safety standards with the precise diagnosis index.

In the vehicle breakdown generation predictor, the first safety standards may be determined on the basis of distribution about index values and the index values may be calculated on the basis of sensing values in a time domain at every first cycle; the second standards may be determined on the basis of distribution of precise diagnosis indexes and the precise diagnosis indexes may be calculated on the basis of sensing values in a frequency domain at every second cycle longer than the first cycle; and a first sampling cycle of the sensing values for calculating the index values may be longer than a second sampling cycle of the sensing values for calculating the precise diagnosis indexes.

In embodiments, a method of providing an automotive preventive maintenance service includes: a vehicle information creation step that creates vehicle information including vehicle diagnosis information obtained in real time while a vehicle is driven and vehicle state information showing a current state of the vehicle; a vehicle breakdown generation prediction step that creates vehicle part states each composed of a preventive maintenance emergency degree and a vehicle part on the basis of the vehicle information, and predicts breakdown generation of the vehicle; an automotive repair shop recommendation step that recommends an automotive repair shop based on a cost or a distance on the basis of the preventive maintenance emergency degree in at least one of the vehicle part states; and a preventive maintenance service compensation step that detects whether to perform a maintenance service about a corresponding vehicle part state according to the preventive maintenance emergency degree, and provides preventive maintenance service compensation.

BRIEF DESCRIPTION OF THE DRAWINGS

FIG. 5 is a diagram showing a process of performing part diagnosis using a complex vibration signal in a process of predicting vehicle breakdown generation of FIG. 4.

FIG. 8 is a diagram showing overwork conditions for a vehicle breakdown generation predictor to measure an aging degree of parts in the process of predicting vehicle breakdown generation of FIG. 4.

FIG. 9 is a diagram showing examples of overwork conditions for a vehicle breakdown generation predictor to measure an aging degree of parts in the process of predicting vehicle breakdown generation of FIG. 4.

FIG. 10 is a diagram showing examples of replacement times in a manual for a vehicle breakdown generation predictor to compare an aging degree and lifespan of parts in the process of predicting vehicle breakdown generation of FIG. 4.

FIG. 11 is a block diagram showing the vehicle breakdown generation predictor of FIG. 3.

FIG. 12 is a flowchart showing a vehicle breakdown generation prediction process that is performed in an apparatus for providing an automotive preventive maintenance service according to the present disclosure.

FIG. 14 is a flowchart showing an embodiment of step S1270 of FIG. 12.

DETAILED DESCRIPTION

The description in the present disclosure is only embodiments for structural and functional description, so the scope of a right of the present disclosure should not be construed as being limited by the embodiments described herein. That is, embodiments may be changed and modified in various ways, so the scope of a right of the present disclosure should be understood as including equivalents that can achieve the spirit of the present disclosure. Further, the objects or effects proposed herein do not mean that the objects or effects should be all included in a specific embodiment or only the effects should be included in a specific embodiment, so the scope of a right of the present disclosure should not be construed as being limited by the objects or effects.

Meanwhile, terms used herein should be understood as follows.

Terms "first", "second", etc. are provided for discriminating one component from another component and the scope of a right is not limited to the terms. For example, the first component may be named the second component, and vice versa.

Singular forms should be understood as including plural forms unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

As used in this specification, terms "vehicle", "vehicular", or other terms are understood as including vehicles, passenger automobiles generally including sports utility vehicles (SUV), buses, trucks, various commercial vehicles, various boats, ships, vessels, airplanes, etc., and including hybrid vehicles, electric vehicles, hybrid electric vehicles, hydrogen vehicles, and other vehicles using alternative fuel (fuel obtained from resources other than oil). As stated in this specification, an electric vehicle (EV) including electric power obtained from a chargeable energy storage device (e.g., one or more rechargeable electrochemical cells or other types of batteries) as a part of its locomotive capabilities. An EV is not limited to a vehicle and may include motor cycles, carts, and scooters. Further, a hybrid vehicle is a vehicle having two or more power sources, for example, gasoline-based power and electricity-based power (e.g., a hybrid electric vehicle (HEV)).

Unless otherwise defined, all terms used herein have the same meaning as commonly understood by those skilled in the art to which the present disclosure belongs. It will be further understood that terms defined in dictionaries that are commonly used should be interpreted as having meanings that are consistent with their meanings in the context of the relevant art and will not be interpreted in an idealized or overly formal sense unless expressly so defined herein.

Figure 1:
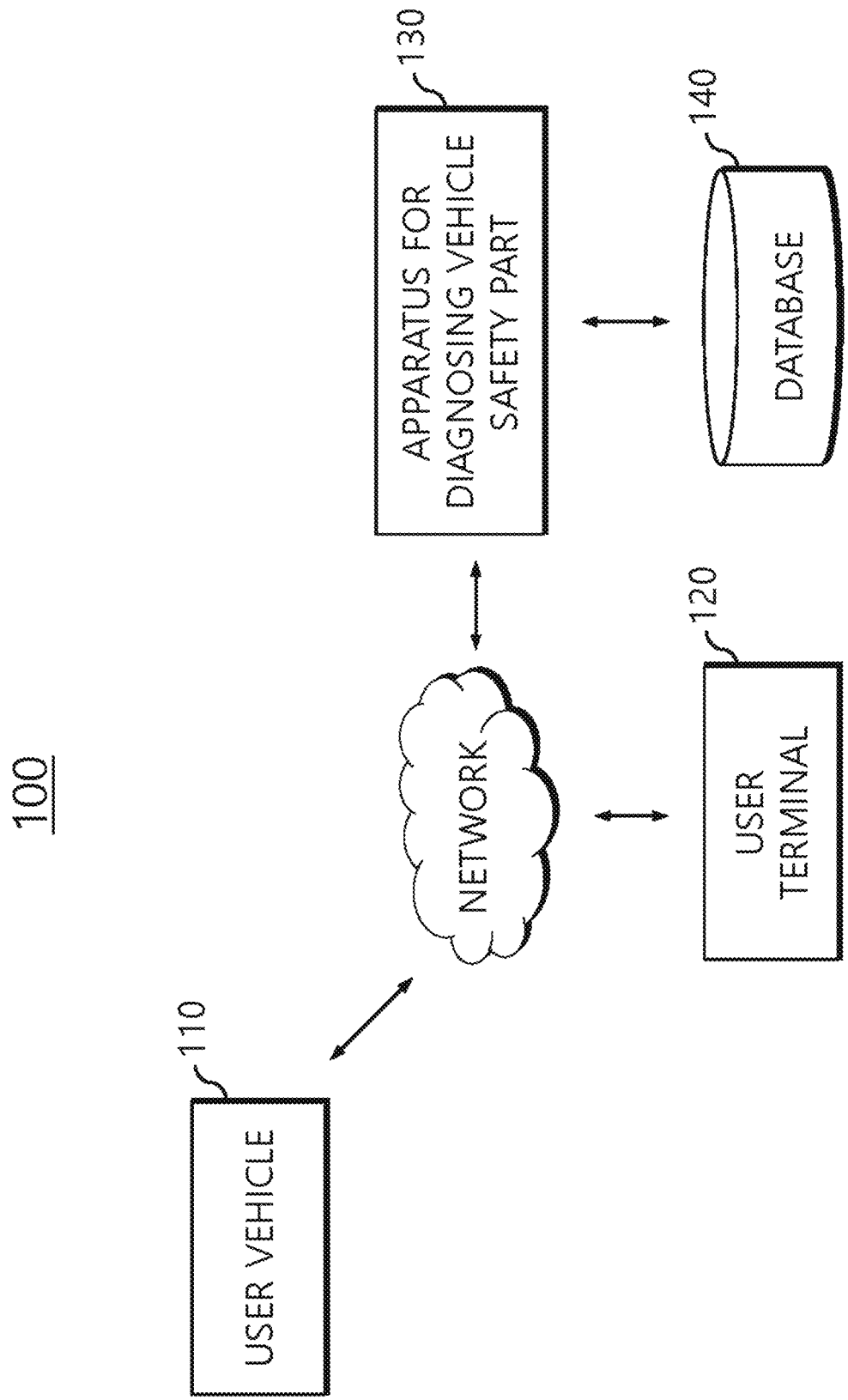
FIG. 1 is a diagram showing a system for providing an automotive preventive maintenance service according to an embodiment of the present disclosure.

FIG. 1 is a diagram showing a system for providing an automotive preventive maintenance service according to an embodiment of the present disclosure.

Referring to FIG. 1, a system 100 for providing an automotive preventive maintenance service may include a user vehicle 110, a user terminal 120, an apparatus 130 for providing an automotive preventive maintenance service, and a vehicle information database 140.

The user vehicle 110, which is a transportation that carries passengers or freights using power produced by an engine, may correspond to a car. The user vehicle 110 may include not only a car, but a ship, an airplane, etc., but is not necessarily limited thereto and may include various transportations that can move using power.

In an embodiment, the user vehicle 110 may include a plurality of sensors that can measure relevant data to monitor the states of various parts. For example, the user vehicle 110 may include an accelerator pedal sensor, a brake pedal sensor, a timing belt vibration sensor, a wheel acceleration sensor, a car body acceleration sensor, a car body inclination angle sensor, a car body vibration sensor, a GPS (Global Positioning System) sensor, a flowmeter, an engine RPM sensor, a vehicle speed sensor, a knuckle vibration sensor, a steering angle sensor, etc.

The user terminal 120 corresponds to a computing device that can receive and use the automotive preventive maintenance service that is provided by the apparatus 130 for providing an automotive preventive maintenance service and may be implemented as a smartphone, a notebook, or a computer, but is not necessarily limited thereto and may also be implemented as various devices such as a tablet PC. The user vehicle 110 can be connected with the apparatus 130 for providing an automotive preventive maintenance service through a network and a plurality of user vehicles 110 may be simultaneously connected with the user terminal 120.

The apparatus 130 for providing an automotive preventive maintenance service may be implemented as a server corresponding to a computer or a program that can provide the automotive preventive maintenance service about a vehicle that the user vehicle 110 has selected. The user terminal 120 can be wirelessly connected with the user vehicle 110 through Bluetooth, Wi-Fi, etc., and can exchange data with the user vehicle 110 through a network.

The apparatus 130 for providing an automotive preventive maintenance service may include the vehicle information database 140 or may be implemented independently from the vehicle information database 140. When independently implemented from the vehicle information database 140, the apparatus 130 for providing an automotive preventive maintenance service is connected with the vehicle information database 140 through wire or wirelessly, thereby being able to exchange data.

In an embodiment, the apparatus 130 for providing an automotive preventive maintenance service can receive sensing values periodically or in real time from a plurality of sensors included in the user vehicle 110, and can diagnose abnormal situations or defects of safety parts and provide the result to the user vehicle 110. In another embodiment, the apparatus 130 for providing an automotive preventive maintenance service may be included in the user vehicle 110.

The vehicle information database 140 can keep various items of information for providing the automotive preventive maintenance service. For example, the vehicle information database 140 can keep normality vehicle diagnosis information according to the kinds of vehicles, normality complex vibration signals according to the kinds of vehicles, vehicle diagnosis information received from the user vehicle 110, information about vehicle state information, etc., but is not limited thereto and may keep information processed in various types in relation to the automotive preventive maintenance service.

Figure 2:
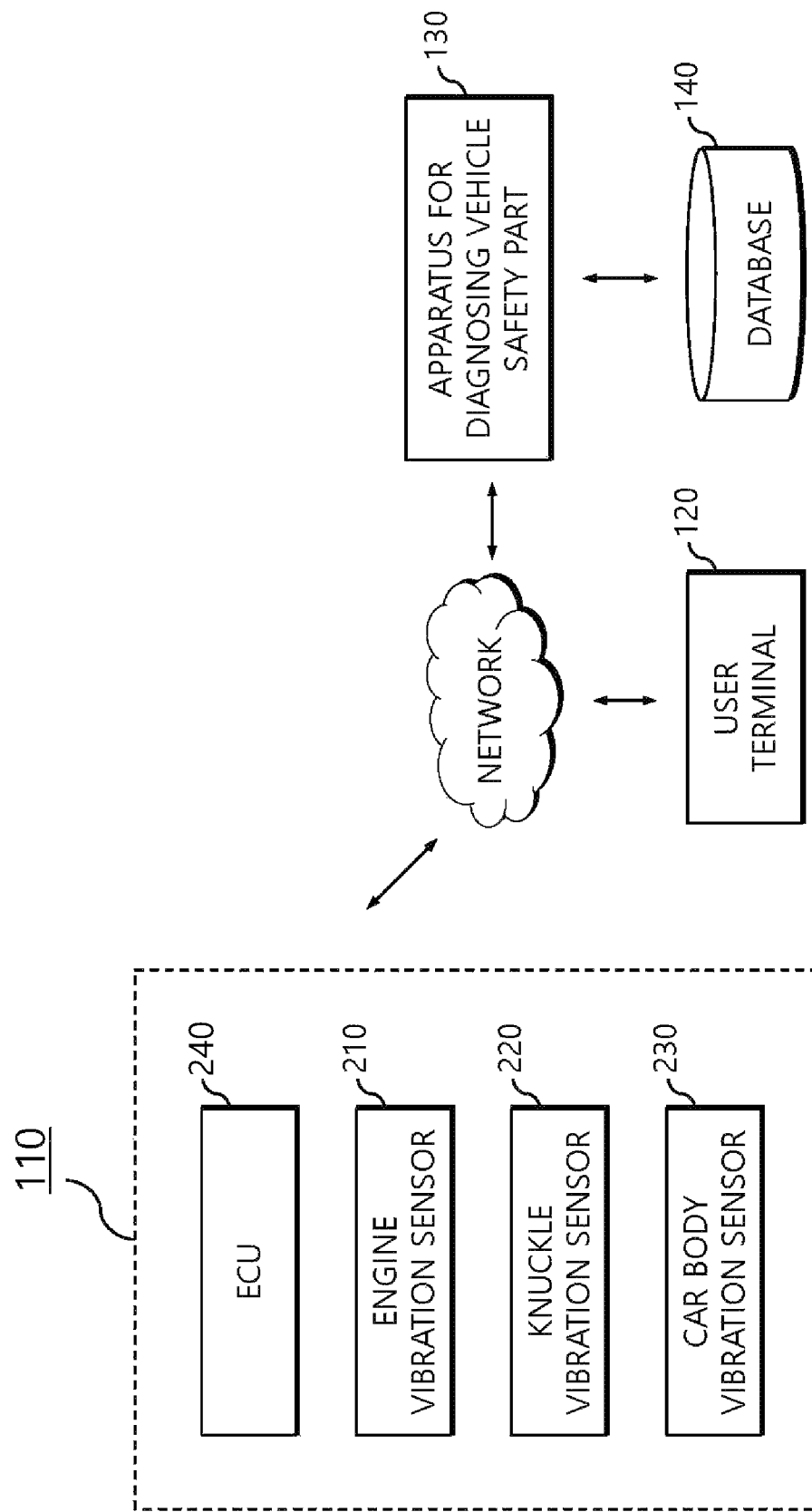
FIG. 2 is a diagram showing the system for providing an automotive preventive maintenance service shown in FIG. 1.

FIG. 2 is a diagram showing the system for providing an automotive preventive maintenance service shown in FIG. 1.

Referring to FIG. 2, the user vehicle 110 includes vibration signals that are sensed by an engine vibration sensor 210, a knuckle vibration sensor 220, and a car body vibration sensor 230.

In an embodiment, the complex vibration signals may include vibration sensing signals of the engine vibration sensor 210, the knuckle vibration sensor 220, and the car body vibration sensor 230. The engine vibration sensor 210 may be attached to the engine of the user vehicle 110 and can sense vibration of a vehicle engine and an engine timing belt and transmit vibration sensing signals to the apparatus 130 for providing an automotive preventive maintenance service.

The knuckle vibration sensor 220 may be mounted on a plurality of steering knuckles of the user vehicle 110. The knuckle vibration sensor 220 may include a multi-axis wheel acceleration sensor. The knuckle vibration sensor 220 can sense wheel vibration and transmit a vibration sensing signal to the apparatus 130 for providing an automotive preventive maintenance service.

The car body vibration sensor 230 may be attached to the car body of the user vehicle 110 as one or more pieces. The car body vibration sensor 230 may include a multi-axis car body acceleration sensor, a multi-axis rotation angle sensor, a multi-axis inclination sensor, and a GPS sensor. The car body vibration sensor 230 can sense vibration of a car body and transmit a vibration signal to the apparatus 130 for providing an automotive preventive maintenance service.

Figure 3:
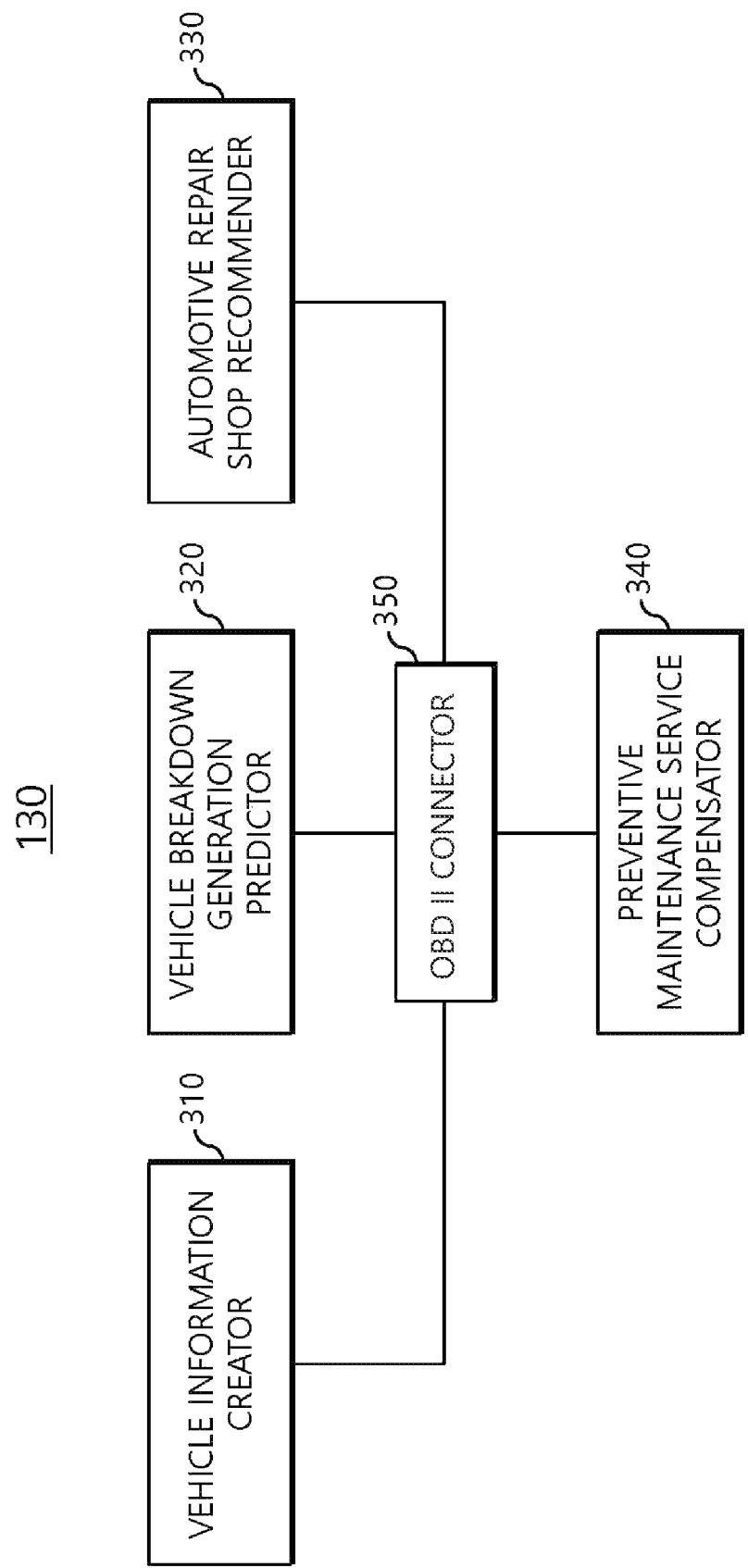
FIG. 3 is a diagram showing an apparatus for providing an automotive preventive maintenance service shown in FIG. 1.

FIG. 3 is a diagram showing an apparatus for providing an automotive preventive maintenance service shown in FIG. 1.

Referring to FIG. 3, the apparatus 130 for providing an automotive preventive maintenance service includes a vehicle information creator 310, a vehicle breakdown generation predictor 320, an automotive repair shop recommender 330, and a preventive maintenance service compensator 340.

The vehicle information creator 310 integrates an engine vibration signal, a knuckle vibration signal, and a car body vibration signal received from the user vehicle 110 and creates vehicle diagnosis information using vehicle information obtained by collecting vehicle information provided by an ECU (Electronic Control Unit) 240 through an OBD II connector 350. The vehicle diagnosis information includes diagnosis information of parts of a vehicle. The vehicle information creator 310 can collect vehicle information provided from the vehicle ECU and can create vehicle state information for the automotive preventive maintenance service.

In an embodiment, the vehicle breakdown generation predictor 320 can receive vehicle diagnosis information and vehicle state information. The vehicle breakdown generation predictor 320 can creates diagnosis information and the vehicle state information and then analyzes the vibration abnormality degree of the parts, thereby being able to detect abnormality, determine an aging degree, and a preventive maintenance emergency degree.

The vehicle breakdown generation predictor 320 includes a part diagnosis algorithm that compares complex vibration signal information of the user vehicle 110 that is being driven and normality diagnosis information of the vehicle information database 140, using a normality complex vibration signal diagnosis information, and an aging degree prediction algorithm that predicts the aging degree of the parts.

In an embodiment, the vehicle breakdown generation predictor 320 can specify parts corresponding to a frequency range in which an abnormality diagnosis result according to vehicle part states is shown. The vehicle breakdown generation predictor 320 can determine the preventive maintenance emergency degree according to the abnormality degree of parts showing an abnormality diagnosis result.

In an embodiment, the aging degree prediction algorithm can calculate a driving overwork degree of the user vehicle 110 and can create a overwork degree driving pattern by a traveling distance and a traveling environment by integrating vehicle diagnosis information and vehicle state information. The aging degree prediction algorithm creates a vehicle part state by predicting an aging degree on the basis of the accumulated amount of an overwork degree calculated from the overwork degree driving pattern and then determines the aging degree to the lifespan period of products and consumables, thereby being able to predict the remaining lifespan.

The vehicle breakdown generation predictor 320 can determine a preventive maintenance emergency degree that means the necessity of replacement and maintenance by analyzing the aging degrees and lifespan results of specific parts and consumables according to vehicle part states.

The automotive repair shop recommender 330 receives a preventive maintenance emergency degree of a part according to the vehicle breakdown generation predictor 320. The automotive repair shop recommender 330 includes an automotive repair shop recommendation function that recommends an automotive repair shop to a user through the user vehicle 110 and the user terminal 120 when there is a specific part that requires maintenance in accordance with a preventive maintenance emergency degree.

The automotive repair shop recommendation function can recommend an automotive repair shop to a user by generally considering the location of the user vehicle 110 and the location of registered automotive repair shops obtained through a GPS system, a maintenance possibility of a specific part at the registered automotive repair shops, the professional skill for maintaining a specific part at the registered automotive repair shops, the cost for maintenance at the registered automotive repair shops, evaluations of the registered automotive repair shops in accordance with a preventive maintenance emergency degree.

The preventive maintenance service provider receives a preventive maintenance emergency degree of a specific part according to the vehicle breakdown generation predictor 320. The preventive maintenance service provider detects whether to perform a maintenance service for the specific part in accordance with the preventive maintenance emergency degree, and provides service compensation to the user through the user vehicle 110 and the user terminal 120.

In an embodiment, the preventive maintenance service compensator 340 provides service compensation by increasing durability of a vehicle, secure driving stability, and performing preventive maintenance by maintaining the specific part according to the preventive maintenance emergency degree, thereby being able to provide a service that discounts a premium of the user using a special contract of an insurance company.

In an embodiment, the apparatus 130 for providing an automotive preventive maintenance service 130 can provide vehicle diagnosis information, vehicle state information, a vehicle part state, overwork degree traveling driving pattern, a diagnosis result of a part, an aging degree of a part, a preventive maintenance emergency degree of a part, prediction of a vehicle breakdown generation, recommendation of an automotive repair shop, and information about service provision through the user vehicle 110 and the user terminal 120.

Figure 4:
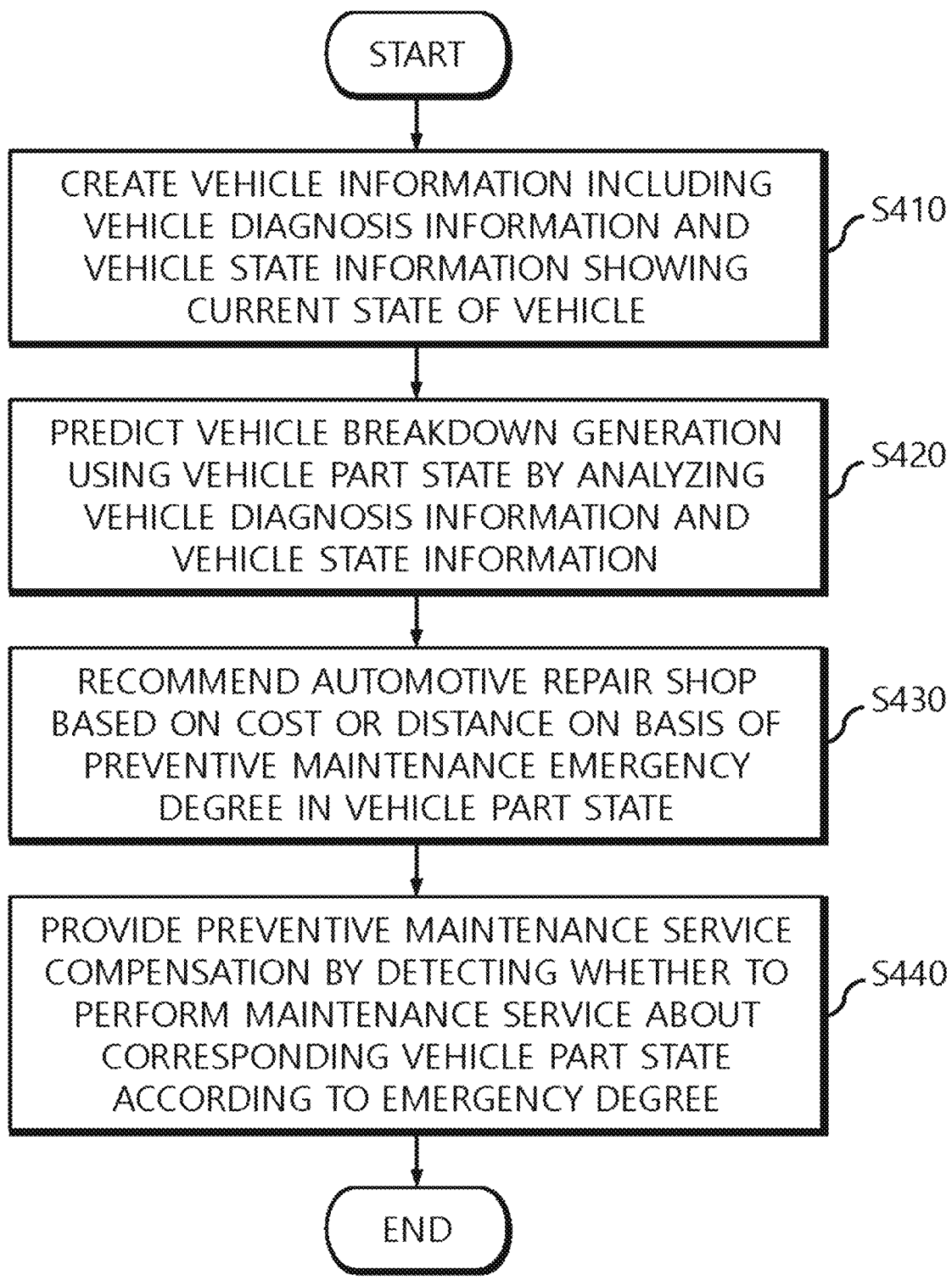
FIG. 4 is a flowchart showing a process of providing an automotive preventive maintenance service that is performed in the system for providing an automotive preventive maintenance service shown in FIG. 1.

FIG. 4 is a flowchart showing a process of providing an automotive preventive maintenance service that is performed in the system for providing an automotive preventive maintenance service shown in FIG. 1.

Referring to FIG. 4, the vehicle information creator 310 can create vehicle diagnosis information by receiving complex vibration information integrating vibration information that is shown during driving through the engine vibration sensor 210, the knuckle vibration sensor 220, and the car body vibration sensor 230 of the user vehicle 110, and can create vehicle state information by receiving vehicle information, which is provided by the ECU 240 of the user vehicle 110 through the OBD II connector (step S410).

The vehicle breakdown generation predictor 320 can create vehicle part states composed a preventive maintenance emergency degree and vehicle parts through the part diagnosis algorithm and the aging degree prediction algorithm on the basis of vehicle diagnosis information. The vehicle breakdown generation predictor 320 can provide a breakdown generation prediction service of a vehicle to a user through the user vehicle 110 and the user terminal 120 by detecting abnormality of parts, determining the aging degree of parts, and maintenance emergency degree using the vehicle part states (step S420).

The automotive repair shop recommender 330 can provide an automotive repair shop recommendation service to a user through the user vehicle 110 and the user terminal 120 on the basis of data integrating the location of a vehicle and the location of registered automotive repair shops obtained through a GPS system, professional skill for maintaining a specific part at the registered automotive repair shops, the cost for maintenance at registered automotive repair shops, etc. in accordance with the preventive maintenance emergency degree for at least one vehicle part state (step S430).

The preventive maintenance service compensator 340 can detect whether to perform a maintenance service about the vehicle part state according to the preventive maintenance emergency degree. The preventive maintenance service compensator 340 provides service compensation by increasing durability of a vehicle, secure driving stability, and performing preventive maintenance by maintaining the specific part according to the preventive maintenance emergency degree, thereby being able to provide a service that discounts a premium of the user using a special contract of an insurance company to a user through the user vehicle 110 and the user terminal 120 (step S440).

In an embodiment, the apparatus 130 for providing an automotive preventive maintenance service 330 can provide vehicle diagnosis information, vehicle state information, a vehicle part state, overwork degree traveling driving pattern, a diagnosis result of a part, an aging degree of a part, a preventive maintenance emergency degree of a part, prediction of a vehicle breakdown generation, recommendation of an automotive repair shop, and information about service provision to a user through the user vehicle 110 and the user terminal 120.

FIG. 5 is a diagram showing a process of performing part diagnosis using a complex vibration signal in a process of predicting vehicle breakdown generation of FIG. 4.

The vehicle breakdown generation predictor 320 can perform part diagnosis through the part diagnosis algorithm and the part diagnosis algorithm may include a specific part diagnosis logic that is composed of a first step for low-frequency analysis and a second step for high-frequency analysis and determines a vibration abnormality degree.

The specific part diagnosis logic may include a diagnosis process that finds out whether is it normal by mathematically analyzing a unique system of a part by converting a complex vibration signal including acceleration signals and vibration signals of vibration sensors into a frequency response function using FFT (Fast Fourier Transform, FFT), and comparing it with normality diagnosis information of the automotive information database 410.

Finally, the part diagnosis algorithm can predict breakdown generation by diagnosing whether there is abnormality in a part on the basis of the complex vibration signal diagnosis information of the user vehicle 110 that is being driven and the frequency band of the frequency response function, using a normality complex vibration signal unique system.

Figure 6:
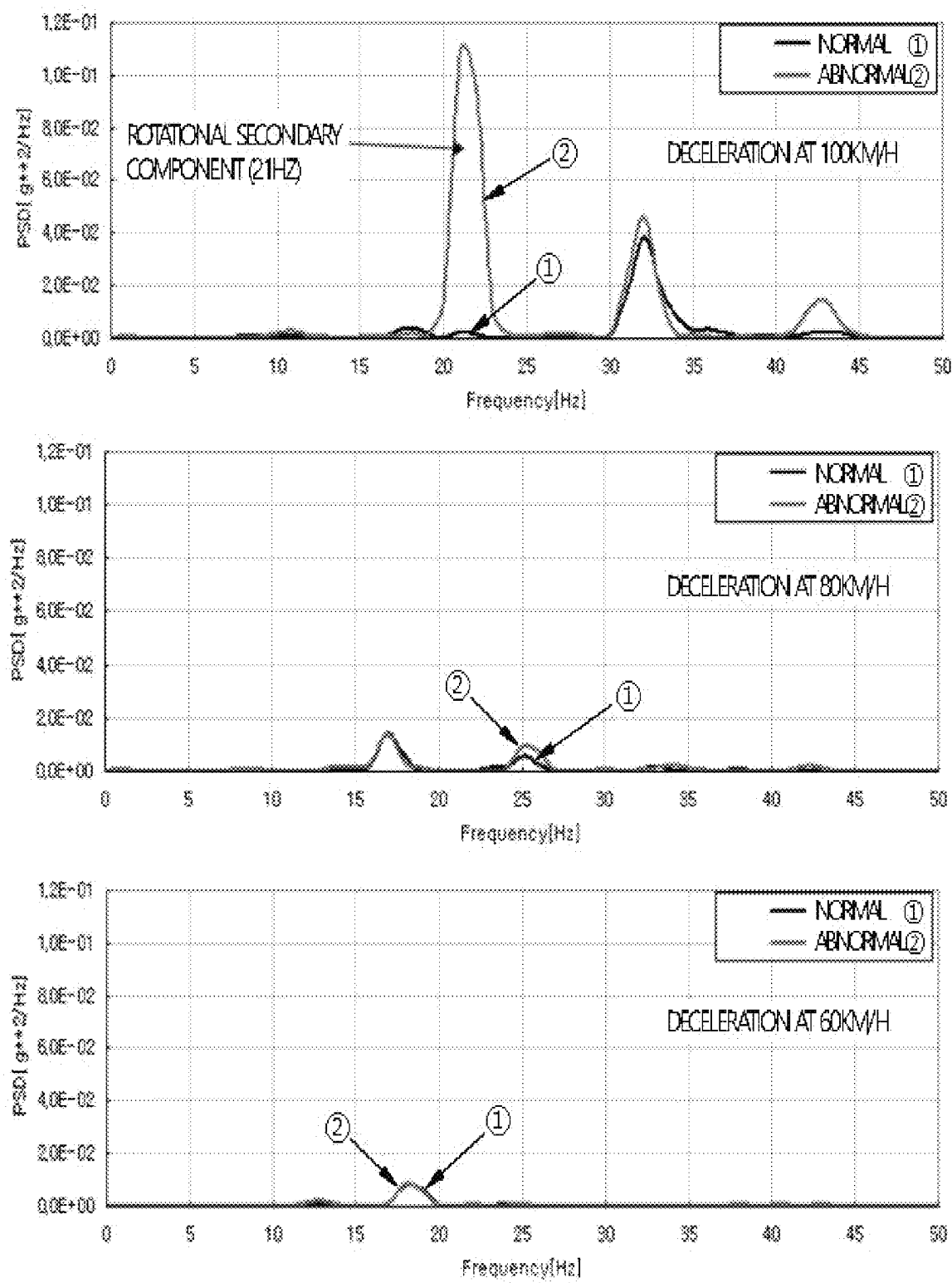
FIG. 6 is a diagram showing continuous velocity joint complex vibration signal analysis in the process of predicting vehicle breakdown generation of FIG. 4.
Figure 7:
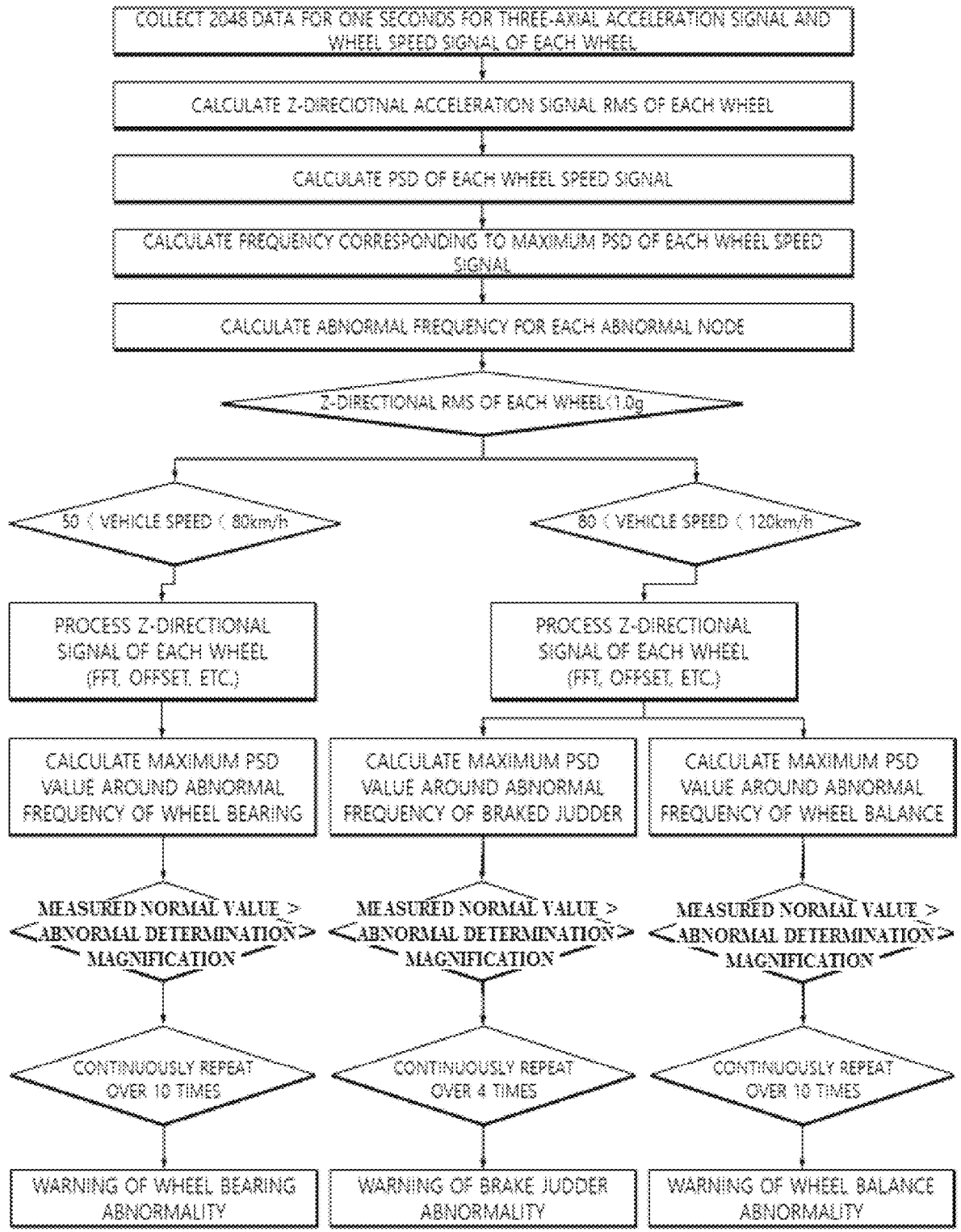
FIG. 7 is a diagram showing a process of performing part diagnosis using wheel bearing, break judder, and wheel balance complex vibration signals in the process of predicting vehicle breakdown generation of FIG. 4.

FIG. 6 is a diagram showing continuous velocity joint complex vibration signal analysis in the process of predicting vehicle breakdown generation of FIG. 4 and FIG. 7 is a diagram showing a process of performing part diagnosis using wheel bearing, break judder, and wheel balance complex vibration signals in the process of predicting vehicle breakdown generation.

In FIG. 6, the vehicle breakdown generation predictor 320 finds out vibration generated by a brake judder in the user vehicle 110 by analyzing a complex vibration signal using the part diagnosis algorithm. Vibration by the brake judder may have an abnormality frequency range showing vibration abnormality in a range of 18-24 Hz.

In FIG. 7, the vehicle breakdown generation predictor 320 performs a comparison diagnosis logic with normality information of the automotive information database 140 on the basis of the frequency band in the complex vibration signal diagnosis information using the part diagnosis algorithm. The vehicle breakdown generation predictor 320 can create a vehicle part state by separately specifying a part corresponding to the frequency range in which an abnormality diagnosis result appears as the result of performing the diagnosis logic.

In an embodiment, the part diagnosis algorithm may include a diagnosis logic that separately specifies corresponding parts for the speed of a vehicle, the angular acceleration of a vehicle, the driving state of a vehicle, the driving environment of a vehicle, the driving inclination of a vehicle, and a frequency range when an abnormality diagnosis result comes out of vehicle diagnosis information including a complex vibration signal in which vibration signals related to various parts such as a wheel bearing, a brake judder, and a wheel balance are integrated.

The part diagnosis algorithm can diagnose whether there is abnormality in parts and separately specifying abnormal parts after creating vehicle part states by analyzing a complex vibration signal including at least one symptom of tire air pressure abnormality, wheel balance abnormality, wheel alignment abnormality, wheel bearing flaking, continuous velocity joint flaking, damper leak, a ball joint over cap, and a brake judder.

In an embodiment, the vehicle breakdown generation predictor 320 can predict breakdown generation for a specific part showing an abnormality diagnosis result through the vehicle part states, and can determine the preventive maintenance emergency degree in accordance with the abnormality degree. The vehicle breakdown generation predictor 320 can create a preventive maintenance emergency degree and can provide vehicle breakdown generation prediction through the user vehicle 110 and the user terminal 120.

FIG. 8 is a diagram showing overwork conditions for a vehicle breakdown generation predictor to measure an aging degree of parts in the process of predicting vehicle breakdown generation of FIG. 4.

Referring to FIG. 8, the vehicle breakdown generation predictor 320 can determine an overwork degree of the user vehicle 110 through an aging degree prediction algorithm on the basis of an overwork state, an analysis sensor kind, specific weight, a driving distance, a driving time, and a contribution degree analyzed on the basis of the vehicle diagnosis information and the vehicle state information, and can predict the aging degrees of vehicle parts on the basis of the aging degree. The aging degree prediction algorithm includes the following formula.

$$M_j = \sum_{i=1}^{I} M_{ji} \qquad \text{[Formula 1]}$$

M is a driving distance of a vehicle. $M_j$ is a driving distance that a vehicle has driven under a j overwork condition of J different kinds of overwork conditions. $M_{ji}$ is an i-th driving distance that a vehicle has driven in driving sections divided into I sections under the j overwork condition of $M_j$.

$$S_j = \sum_{i=1}^{I} W_{ji} M_{ji} C_{ji} \qquad \text{[Formula 2]}$$

S is an overwork degree of a vehicle. $S_j$ is an overwork degree of a vehicle when the vehicle is driven in a j overwork condition of J different kinds of overwork conditions. $M_{ji}$ is an i-th driving distance that a vehicle has driven in driving sections divided into I sections under the j overwork condition of $M_j$. $W_{ji}$ is a specific weight constant for the i-th driving section of driving sections divided into I sections under the j overwork condition. $C_{ji}$ is a contribution degree for the i-th driving section of driving sections divided into I sections under the j overwork condition.

Accordingly, the entire overwork degree of a vehicle can be shown as the sum of $S_T$ and $S_j$.

$$S_T = \sum_{j=1}^{J} S_j \qquad \text{[Formula 3]}$$

$S_T$ is the entire overwork degree which is the sum of $S_j$s to the j-th overwork condition in the J overwork conditions.

In an embodiment, the vehicle breakdown generation predictor 320 can calculate the overwork degree of a vehicle using an overwork state, an analysis sensor kind, a specific weight, a driving distance, a driving time, and a contribution degree analyzed from the vehicle diagnosis information and the vehicle state information using the aging degree prediction algorithm. The vehicle breakdown generation predictor 320 can create an overwork driving pattern of a vehicle using the calculated overwork degree.

FIG. 9 is a diagram showing examples of overwork conditions in which a vehicle breakdown generation predictor that predicts vehicle breakdown generation of FIG. 4 measures an aging degree of parts.

In FIG. 9, the vehicle breakdown generation predictor 320 can calculate an overwork degree of the user vehicle 110 by determining specific weight and contribution degree conditions for each of J overwork conditions through the aging degree prediction algorithm, and can predict aging degrees of vehicle parts on the basis of an overwork accumulation amount due to an overwork driving pattern.

In an embodiment, the vehicle breakdown generation predictor 320 can determine other weight and contribution degree conditions for each overwork condition through the aging degree prediction algorithm in accordance with FIG. 9. The "1-DP" stated in the contribution degree condition means that the contribution degree is a one-dimensional parameter and the "2-DP" means that the contribution degree is a two-dimensional parameter. The vehicle breakdown generation predictor 320 can calculate the overwork degree of a vehicle by determining specific weight and contribution degree conditions for each of J overwork conditions and can create a vehicle part state of the user vehicle 110 on the basis of the calculated and accumulated overwork degree. The vehicle breakdown generation predictor 320 can provide the vehicle part state and the overwork degree driving pattern obtained using the aging degree prediction algorithm to a user through the user vehicle 110 and the user terminal 120.

FIG. 10 is a diagram showing examples of replacement times in a manual for a vehicle breakdown generation predictor to compare an aging degree and lifespan of parts in the process of predicting vehicle breakdown generation of FIG. 4.

In FIG. 10, the vehicle breakdown generation predictor 320 predicts the aging degrees of vehicle parts and consumables on the basis of the overwork degree calculated and accumulated by the aging degree prediction algorithm and then compare the aging degrees with the vehicle part lifespan, replacement period, and consumables replacement time data in the vehicle information database 140, thereby creating vehicle part states.

In an embodiment, $M_S$ and $T_S$ are a driving distance and a driving time of a vehicle under an overwork condition, and $M_N$ and $T_N$ are a driving time of a vehicle under a normal condition. The vehicle breakdown generation predictor 320 can predict vehicle breakdown generation by determining the aging degrees of parts and creating preventive maintenance emergency degrees on the basis of the vehicle part states. The vehicle part states may include the part states of parts, such as engine oil, an oil filter, an air cleaner filter, an ignition plug, a brake disc, brake pad, a lower arm ball joint cleaning, drive shaft and boot, an air conditioner air filter, rear-differential oil, a transfer case, and automatic transmission oil, and consumables.

In an embodiment, the vehicle breakdown generation predictor 320 determines the aging degrees of parts and consumables on the basis of the vehicle part states and generates preventive maintenance emergency degrees including consumables requiring replacement and parts requiring maintenance, thereby being able to provide vehicle breakdown generation prediction through the user vehicle 110 and the user terminal 120.

As a result, the apparatus 130 for providing an automotive preventive maintenance service receives a complex vibration signal and information about the ECU 240 from the user terminal 110. The vehicle information creator 310 creates vehicle state information and vehicle diagnosis information using the received complex vibration signal and information about the ECU 240. The vehicle breakdown generation predictor 320 creates vehicle part states on the basis of the created vehicle state information and the vehicle diagnosis information and predicts vehicle breakdown generation on the basis of preventive maintenance emergency degrees by determining the vehicle part states. The automotive repair shop recommender 330 provides a service of recommending an automotive repair shop to a user by predicting vehicle breakdown generation based on the preventive maintenance emergency degree. The preventive maintenance service compensator 340 can provide a compensation service to a user who has undergone preventive maintenance. The system 100 for providing an automotive preventive maintenance service can provide various items of information through the user vehicle 110 and the user terminal 120.

FIG. 11 is a block diagram showing the vehicle breakdown generation predictor of FIG. 3.

Referring to FIG. 11, the vehicle breakdown generation predictor 320 may include a vehicle state summarization module 321, a vehicle state distribution calculation module 322, an abnormal safety part detection module 323, and a precise diagnosis performance module 324.

The vehicle state summarization module 321 can summarize a vehicle state on the basis of sensing values collected for a specific period from a plurality of sensors. In this case, summarizing a vehicle space may mean integrate various items of information so that the current state of the user vehicle 110 can be easily found out. For example, the vehicle state summarization module 321 can simply arrange a vehicle state by summarizing sensing values received for a predetermined period from a plurality of sensors included in the user vehicle 110 into index values for diagnosis items.

In an embodiment, the vehicle state summarization module 321 can summarize a vehicle state by calculating index values for a plurality of diagnosis items constituting a vehicle state using sensing values collected for a specific period. In this case, the specific period may be a time period for collecting sensing values and the diagnosis items may diagnosis targets corresponding to safety parts of the vehicle. The specific period and the diagnosis items may be set in advance or automatically by the apparatus 130 for providing an automotive preventive maintenance service.

The diagnosis items may include diagnosis points and at least one diagnosis parameter in accordance with the types of the diagnosis items. For example, the types of the diagnosis items may include engine overheating, a ball joint over gap, a fixed quantity of refueling, sudden start, a driving shaft, a wheel bearing, wheel unbalance, a brake judder, a damper, a timing belt, and wheel alignment, but are not necessarily limited thereto and may include various diagnosis items that can be used for safety part diagnosis.

The kinds of diagnosis items each may include the following diagnosis points and at least one parameter (but, diagnosis item: diagnosis point (diagnosis parameter)).

1) Engine overheating: engine temperature (engine RPM, vehicle speed, accelerator pedal angle, external air temperature)
2) Ball joint over gap: double integral value [knuckle vibration–car body vibration] (vehicle speed, acceleration/deceleration)
3) Fixed quantity of refueling: refueling amount [final fuel amount–initial fuel amount] (initial amount of fuel, GPS)
4) Sudden start: acceleration [differentia value of vehicle speed] (vehicle speed, angle of accelerator pedal, engine RPM)
5) Driving shaft: knuckle vibration (engine RPM, vehicle speed, steering angle)
6) Wheel bearing: knuckle vibration (engine RPM, vehicle speed, angle of accelerator pedal)
7) Wheel unbalance: knuckle vibration (engine RPM, vehicle speed, angle of accelerator pedal)
8) Brake judder: knuckle vibration (engine RPM, vehicle speed, deceleration)
9) Damper: [car body vibration–knuckle vibration] (steering angle, vehicle speed, acceleration/deceleration)
10) Timing belt: timing belt vibration [or engine vibration] (engine RPM, vehicle speed, angle of accelerator pedal)
11) Wheel alignment: transverse vibration of wheel (engine RPM, vehicle speed)

When the diagnosis item is engine overheating and the driving distance of the vehicle is larger than a set driving distance, the apparatus 130 for providing an automotive preventive maintenance service can diagnose this case as engine overheating and can collect actual engine temperature at the engine RPM, vehicle speed, and accelerator pedal angle measured by sensors as vehicle state information.

When the diagnosis item is an over gap of a ball joint, the apparatus 130 for providing an automotive preventive maintenance service can diagnose this case as an over gap of a ball joint with the brake pedal on and the accelerator pedal off or can diagnose this case as an over gap of a ball joint with the brake pedal off and the accelerator pedal on. The diagnosis parameters with the brake pedal on and the accelerator pedal off are vehicle speed and deceleration, and the diagnosis parameters with the brake pedal off and the accelerator pedal on are vehicle speed and acceleration.

When the diagnosis item is a fixed quantity of refueling, the apparatus 130 for providing an automotive preventive maintenance service can diagnose this case as a fixed quantity of refueling when an engine is stopped and then started and the difference between the initial amount of fuel at the point in time at which the engine is stopped and the final amount of fuel at the point in time at which the engine is stopped again is a set value or more. When the diagnosis item is sudden start, the apparatus 130 for providing an automotive preventive maintenance service can diagnose this case as sudden start with the brake pedal on and the acceleration larger than 0.

When the diagnosis item is wheel unbalance, the apparatus 130 for providing an automotive preventive maintenance service can perform diagnosis with the brake pedal off. When the diagnosis item is a brake judder, the apparatus 130 for providing an automotive preventive maintenance service can perform diagnosis with the brake pedal on and the accelerator pedal off. When the diagnosis item is a timing belt, the apparatus 130 for providing an automotive preventive maintenance service can perform diagnosis with the brake pedal off. When the diagnosis item is wheel alignment, the apparatus 130 for providing an automotive preventive maintenance service can perform diagnosis with the brake pedal off.

The vehicle state summarization module 321 can collect various sensing values from a plurality of sensors for a specific period, and can use all the collected sensing values or sample and use only some of the sensing values. The collection cycle or the sampling cycle of the sensing values may be set in advance or automatically by the apparatus 130 for providing an automotive preventive maintenance service.

The vehicle state summarization module 321 can determine diagnosis points and indexes of diagnosis parameters for the kinds of the diagnosis items, and can calculate index values for the diagnosis items using index information collected for a specific period. In this case, the index may be a step in which a measured specific sensing value is included when the measurement range of sensing values that are collected from sensors are classified into predetermined levels, and the index value may be a value that is calculated using the index information collected for a specific period and represents a corresponding specific period.

For example, the vehicle state summarization module 321 calculates an index value for engine overheating that is one of the diagnosis items on the basis of sensing values collected for a predetermined period, and this process is as follows.

(a) Sensing values are collected from respectively corresponding sensors for an engine RPM, vehicle speed, and an accelerator pedal angle that are diagnosis parameters constituting engine temperature that is a diagnosis point.

(b) When the engine RPM is 230 RPM, the vehicle speed is 35 km/h, and the accelerator pedal angle is 15°, the index of the engine RPM, the index of the vehicle speed, and the index of the accelerator pedal angle are respectively determined as 2, 3, and 1 (but, the engine RPM 230 RPM corresponds to a second level of an RPM range, the vehicle speed 35 km/h corresponds to a third level of a speed range, and the accelerator pedal angle 15° corresponds to a second level of an angle range).

(c) An index of engine temperature that is a diagnosis point of engine overheating is determined on the basis of the index information calculated for the diagnosis parameters (but, the detailed process will be described in more detail with reference to FIGS. 4 to 6).

(d) An index value for engine overheating is calculated using the index information for the engine temperature for a specific period (here, the index value may correspond any one of an average $$\left(\bar{x} = \sum_{i=1}^{N} x(i)/n\right),$$

a peak $$\left(\frac{1}{2}\{\max(x(t)) - \min(x(t))\}\right),$$

an effective value $$\left(\sqrt{\frac{1}{N}\sum_{i=1}^{N}(x(i) - \bar{x})^2}\right),$$

a fluctuation ratio $$\left(\frac{\text{Peak}}{\text{RMS}}\right),$$

a pointed degree $$\left(\frac{\sum_{i=1}^{N}(x(i) - \bar{x})^4}{(N(RMS)^4}\right),$$

skewness $$\left(\frac{\sum_{i=1}^{N}(x(i) - \bar{x})^3}{(N(RMS)^3}\right),$$

a clearance factor $$\left(\frac{\text{Peak}}{\frac{1}{N}\left(\sum_{i=1}^{N}\sqrt{|x(i)|}\right)^2}\right),$$

an impulse factor $$\left(\frac{\text{Peak}}{\frac{1}{N}\left(\sum_{i=1}^{N}\sqrt{|x(i)|}\right)}\right),$$

a shape factor $$\left(\frac{RMS}{\frac{1}{N}\sum_{i=1}^{N}|x(i)|}\right),$$

a probability function $$\left(P(x_i < x(t) \le x_i + \Delta x) = \sum_{i=1}^{N}\frac{\Delta t_i}{T} = \int P(x)dx = 1\right),$$

and statistical moment $$\left(P(x) = \frac{1}{B(b-a)^{\alpha+\beta-1}}(x-a)^{\alpha-1}(b-x)^{\beta-1}, B \Rightarrow \int P(x)dx = 1\right)$$

of the indexes collected for a specific period).

The vehicle state distribution calculation module 322 can calculate distribution about summary of vehicle states for a plurality of specific periods. The apparatus 130 for providing an automotive preventive maintenance service can divide the entire period for vehicle safety part diagnosis into a plurality of specific periods, and the vehicle state distribution calculation module 322 can arrange a plurality of specific periods in order to time and then can integrate distribution about summary of a vehicle state for the entire period.

In an embodiment, the vehicle state distribution calculation module 322 can create multi-dimensional coordinate system composed of coordinate axes respectively corresponding to a plurality of diagnosis items and can calculate distribution about a plurality of index values for a plurality of specific periods in the multi-dimensional coordinate system. The vehicle state distribution calculation module 322 can integrally show index values for diagnosis items for the entire period calculated by the vehicle state summarizer 210 in one coordinate system.

The multi-dimensional coordinate system may be implemented such that each axis corresponds to one diagnosis item, and the units of the axes may respectively correspond to the index unit for diagnosis pints of diagnosis items. For example, when there are a total of three diagnosis items of engine overheating, over gap of a ball joint, and a fixed quantity of refueling, a first axis of the multi-dimensional coordinate system may correspond to the engine overheating, a second axis may correspond to the over gap of a ball joint, and a third axis may correspond to the fixed amount of refueling. Further, when the index of engine temperature is divided into a total of ten levels, the first axis can use a unit divided into a total of ten levels.

In an embodiment, the vehicle state distribution calculation module 322 can create multi-dimensional coordinate system composed of coordinate axes respectively corresponding to a plurality of sensors and can calculate distribution about a plurality of sensor values for a plurality of specific periods in the multi-dimensional coordinate system. In another embodiment, the vehicle state distribution calculation module 322 can create a multi-dimensional coordinate system corresponding to a plurality of diagnosis items. Axes of a multi-dimensional coordinate system that correspond to one diagnosis item may correspond to sensors related to diagnosis parameters included in the diagnosis item. The apparatus 130 for providing an automotive preventive maintenance service can store the multi-dimensional coordinate system created by the vehicle state distribution calculator 230 in a database 150 and can use the multi-dimensional coordinate system for safety part diagnosis.

The abnormal safety part detection module 323 can detect an abnormal safety part by determining an abnormal situation related to a specific sensing value through distribution about summary of a vehicle state. For example, when a multi-dimensional coordinate system is composed of axes respectively corresponding to sensors and when there is a sensing value spaced a specific distance apart from sensing values distributed in a predetermined region through distribution about summary of a vehicle state, it is determined that there is an abnormal situation in the sensing value, thereby being able to determine that there is abnormality in a safety part related to the corresponding sensor.

In an embodiment, the abnormal safety part detection module 323 can determine a first safety standard for coordinate axes on the basis of distribution about a plurality of index values in a multi-dimensional coordinate system and can determine a safety part related to a diagnosis item corresponding to a corresponding axis as an abnormal safety part when there is an index value out of the first safety standard.

The first safety standards for diagnosis items can be calculated as follows.

1) Engine Overheating

Trefer (engine RPM, vehicle speed, accelerator pedal angle, external air temperature)=Ref. Level of Index (engine RPM, vehicle speed, accelerator pedal angle, external air temperature)*Fte (1.5, 2.0: warning, alarm) in index of engine temperature (engine RPM, vehicle speed, accelerator pedal angle, external air temperature) at RPMTL<engine RPM<RPMTH, VTL (engine RPM)<vehicle speed<VTH (engine RPM), and ATL (engine RPM, vehicle speed)<accelerator pedal angle<ATH (engine RPM, vehicle speed) & CLASS (external air temperature)

2) Ball Joint Over Gap

Dvref (vehicle speed, deceleration)=Ref. Level of Index (vehicle speed, deceleration)*Fdv (=1.5, 2.0: warning, alarm) at VDL<vehicle speed VDH and DVL (vehicle speed)<deceleration<DVH (vehicle speed)

Pcref (vehicle speed, acceleration)=Ref. Level of Index (speed, acceleration)*Fpc (=1.5, 2.0: warning, alarm) at VPL<vehicle speed VPH and AVL (vehicle speed)<acceleration<AVH (vehicle speed)

3) Fixed Amount of Refueling

Qref (initial amount of fuel, GPS)=Qpeak (initial amount of fuel, GPS)*Fq (=1.05, 1.10: warning, alarm) in amount of refueling (initial amount of fuel, GPS) at QTL<initial amount of fuel<QTH and GPS 4) Sudden Start Aref (vehicle speed, accelerator pedal angle, engine RPM)=Apeak (vehicle speed, accelerator pedal angle, engine RPM)*Fa (=1.05, 1.10: warning, alarm) at RPMFL<engine RPM<RPMFH, VAL (engine RPM)<speed<VAH (engine RPM), and ATL (engine RPM, vehicle speed)<accelerator pedal angle<ATH (engine RPM, vehicle speed)

5) Driving Shaft

Dsref (vehicle speed, steering angle)=Ref. Level of Index (vehicle speed, steering angle)*Fds (=1.5, 2.0: warning, alarm) in Index of BPF knuckle vibration (vehicle speed, steering angle) at VNL<vehicle speed<VNH, and STL (vehicle speed)<steering angle<STH (vehicle speed)

6) Wheel Bearing

Wbref (vehicle speed, accelerator pedal angle)=Ref. Level of Index (vehicle speed, accelerator pedal angle)*Fwb (=1.5, 2.0: warning, alarm) in Index of BPF knuckle vibration (vehicle speed, accelerator pedal angle) at VNL<vehicle speed<VNH, and ATL (vehicle speed)<accelerator pedal angle<ATH (vehicle speed)

7) Wheel Unbalance

Wuref (vehicle speed, accelerator pedal angle)=Ref. Level of Index (vehicle speed, accelerator pedal angle)*Fwu (=1.5, 2.0: warning, alarm) in Index of LPF knuckle vibration (vehicle speed, accelerator pedal angle) at VNL<vehicle speed<VNH, and ATL (vehicle speed)<accelerator pedal angle<ATH (vehicle speed)

8) Brake Judder

Jdref (vehicle speed, deceleration)=Ref. Level of Index (vehicle speed, accelerator pedal angle)*Fjd (=1.5, 2.0: warning, alarm) in Index of LPF knuckle vibration (vehicle speed, deceleration) at VNL<vehicle speed<VNH, and DTL (vehicle speed)<deceleration<DTH (vehicle speed)

9) Damper

Dpref (steering angle, vehicle speed, deceleration)=Ref. Level of Index (steering angle, vehicle speed, deceleration) *Fdp (=1.2, 1.5: warning, alarm) in Index of LPF damping vibration [car body vibration−knuckle vibration] (steering angle, vehicle speed, deceleration) at STRL<steering angle<STRH, VLL (steering angle)<vehicle speed<VLH (steering angle), and ADL (steering angle, vehicle speed)<deceleration<ADH (steering angle, vehicle speed)

10) Timing Belt

Trefer (engine RPM, vehicle speed, accelerator pedal angle)=Ref. Level of Index (engine RPM, vehicle speed, accelerator pedal angle)*Ftb (1.2, 1.5: warning, alarm) in index of BPF engine vibration (engine RPM, vehicle speed, accelerator pedal angle) at RPMNL<engine RPM<RPMNH, VNL (engine RPM)<vehicle speed<VNH (engine RPM), and ATL (engine RPM, vehicle speed)<accelerator pedal angle<ATH (engine RPM, vehicle speed)

11) Wheel Alignment

Waref (vehicle speed)=Ref Level of Index (vehicle speed)*Fwa (=1.2, 1.5: warning, alarm) in Index of LPF transverse vibration of wheel (vehicle speed) at VNL<vehicle speed<VNH In an embodiment, when an index value related to a corresponding coordinate axis and being out of the first safety standard exists for a specific number of specific continuous periods, the abnormal safety part detection module 323 can determine a safety part related to the diagnosis item corresponding to the coordinate axis as an abnormal safety part. The predetermined number 'n' (n is a natural number) may be set in advance or automatically in the apparatus 130 for providing an automotive preventive maintenance service.

Diagnosis algorithms respectively for diagnosis items may be defined as follows.

1) Engine Overheating

Index of engine temperature (engine RPM, vehicle speed, accelerator pedal angle, external air temperature)>Teref (engine RPM, vehicle speed, accelerator pedal angle, external air temperature) & Repeat (n) at RPMT0<engine RPM<RPMT1, VT0 (engine RPM)<vehicle speed<VT1 (engine RPM), and AT0 (engine RPM, vehicle speed)<accelerator pedal angle<AT1 (engine RPM, vehicle speed) & CLASS (external air temperature)

2) Ball Joint Over Gap

Index of dive_joint relative displacement (vehicle speed, deceleration)>Dvref (vehicle speed, deceleration) & Repeat (n) at VT0<vehicle speed<VT1 and DVT0 (vehicle speed)<deceleration<DVT1 (vehicle speed)

Index of pitch_joint relative displacement (vehicle speed, acceleration)>Pcref (vehicle speed, acceleration) & Repeat (n) at VT0<vehicle speed<VT1 and AVT0 (vehicle speed)<acceleration<AVT1 (vehicle speed)

3) Fixed Amount of Refueling

Difference of refueling amount [amount of refueling−flow rate by flowmeter] (initial amount of fuel, GPS)<Qref (initial amount of fuel, GPS) at QT0<initial amount of fuel<QT1 and GPS 4) Sudden Start acceleration=differential [vehicle speed] (vehicle speed, accelerator pedal angle, engine RPM)>limited acceleration $a_c$ (vehicle speed, accelerator pedal angle, engine RPM) at RPMF0<engine RPM<RPMF1, VT0 (engine RPM)<speed<VT1 (engine RPM), and AT0 (engine RPM, vehicle speed)<accelerator pedal angle<AT1 (engine RPM, vehicle speed)

5) Driving Shaft

Index of BPF knuckle vibration (vehicle speed, steering angle)>Dsref (vehicle speed, steering angle) & Repeat(n) at VNL<vehicle speed<VNH, and STL (vehicle speed)<steering angle<STH (vehicle speed)

6) Wheel Bearing

Index of BPF knuckle vibration (vehicle speed, accelerator pedal angle)>Wbref (vehicle speed, accelerator pedal angle) & Repeat(n) at VNL<vehicle speed<VNH, and ATL (vehicle speed)<accelerator pedal angle<ATH (vehicle speed)

7) Wheel Unbalance

Index of LPF knuckle vibration (vehicle speed, accelerator pedal angle)>Wuref (vehicle speed, accelerator pedal angle) & Repeat(n) at VNL<vehicle speed<VNH, and ATL (vehicle speed)<accelerator pedal angle<ATH (vehicle speed)

8) Brake Judder

Index of LPF knuckle vibration (vehicle speed, deceleration)>Jdref (vehicle speed, deceleration) & Repeat(n) at VNL<vehicle speed<VNH, and ATL (vehicle speed)<deceleration<ATH (vehicle speed)

9) Damper

Index of LPF damping vibration=[car body vibration−knuckle vibration] (steering angle, vehicle speed, deceleration)>Dpref (steering angle, vehicle speed, deceleration) & Repeat(n) at STRL<steering angle<STRH, VLL (steering angle)<vehicle speed<VLH (steering angle), and ADL (steering angle, vehicle speed)<deceleration<ADH (steering angle, vehicle speed)

10) Timing Belt

Index of BPF engine vibration (engine RPM, vehicle speed, accelerator pedal angle)>Tbref (engine RPM, vehicle speed, accelerator pedal angle) & Repeat(n) at RPMNL<engine RPM<RPMNH, VNL (engine RPM)<vehicle speed<VNH (engine RPM), and ATL (engine RPM, vehicle speed)<accelerator pedal angle<ATH (engine RPM, vehicle speed)

11) Wheel Alignment

Index of LPF transverse vibration of wheel (vehicle speed)>Waref(vehicle speed) & Repeat(n) at VNL<vehicle speed<VNH The precise diagnosis performance module 324 can perform precise diagnosis on an abnormal safety part. In more detail, as for the engine overheating, ball joint over gap, wheel alignment, sudden start, and a fixed quantitative of refueling of the diagnosis items, the precise diagnosis performance module 324 can immediately determine that there is a defect in safety parts related to corresponding diagnosis items through comparison with the first safety standards. Further, as for the driving wheel, wheel bearing, wheel alignment, brake judder, damper, timing belt, and wheel alignment of the diagnosis items, the precise diagnosis performance module 324 can perform additional diagnosis on the abnormal safety part determined through comparison with the first safety standards.

In an embodiment, the precise diagnosis performance module 324 can calculate precise diagnosis indexes through any one of envelope analysis and Fast Fourier Transform (FFT) on the basis of sensing values collected for a specific period for sensors related to abnormal safety parts. The apparatus 130 for providing an automotive preventive maintenance service can set in advance which one of envelope analysis and FFT it will use in accordance with the types of diagnosis items. Envelope analysis or FFT is well known to those skilled in the art, so they are not described in detail.

For example, when a diagnosis related to an abnormal safety part is a driving shaft, the precise diagnosis performance module 324 can calculate an enveloping spectrum through envelope analysis for sensing values of diagnosis parameters related to knuckle vibration that is the diagnosis pint of the driving shaft. The precise diagnosis performance module 324 can perform precise diagnosis using the enveloping spectrum as a precise diagnosis index for the 'driving shaft'.

In an embodiment, the precise diagnosis performance module 324 can sample and use sensing values collected for a specific period to calculate a precise diagnosis index. Further, the precise diagnosis performance module 324 can perform sampling with a cycle shorter than the cycle in which the vehicle state summarization module 321 samples sensing values to summarize a vehicle state.

In an embodiment, the precise diagnosis performance module 324 can determine second safety standards on the basis of precise diagnosis indexes for a plurality of specific periods, and can diagnose defects of abnormal safety parts by comparing the second safety standards and the precise diagnosis indexes. In more detail, the precise diagnosis performance module 324 can determine that there is a defect in a safety part when there is a precise diagnosis index exceeding the second safety standards.

The second safety standards for diagnosis items can be calculated as follows.

1) Driving Shaft

Sdvref–dsdfi (vehicle speed, steering angle)=Ref. Level of Index (vehicle speed, steering angle)*Fds (=1.5, 2.0: warning, alarm) in Index of BPF knuckle vibration Enveloping Spectrum (vehicle speed, steering angle) on driving defect frequency(dsdfi), at VNL<vehicle speed<VNH, and STL (vehicle speed)<steering angle<STH(vehicle speed)

2) Wheel Bearing

Swbref–wbdfi (vehicle speed, accelerator pedal angle)= Ref. Level of Index (vehicle speed, accelerator pedal angle)*Fwb (=1.5, 2.0: warning, alarm) in Index of BPF knuckle vibration Enveloping Spectrum (vehicle speed, accelerator pedal angle) on wheel bearing defect frequency (wdfi) at VNL<vehicle speed<VNH, and ATL (vehicle speed)<accelerator pedal angle<ATH (vehicle speed)

3) Wheel Unbalance

Swuref–wudfi (vehicle speed, accelerator pedal angle)= Ref. Level of Index (vehicle speed, accelerator pedal angle)*Fwn (=1.5, 2.0: warning, alarm) in Index of LPF knuckle vibration FFT Spectrum (vehicle speed, accelerator pedal angle) on wheel balance defect frequency(wudfi) at VNL<vehicle speed<VNH, and ATL (vehicle speed)<accelerator pedal angle<ATH (vehicle speed)

4) Brake Judder

Sjdref–jddfi (vehicle speed, deceleration)=Ref. Level of Index (vehicle speed, deceleration)*Fjd (=1.5, 2.0: warning, alarm) in Index of LPF knuckle vibration FFT Spectrum (vehicle speed, deceleration) on brake judder defect frequency (jddfi) at VNL<vehicle speed<VNH, and DTL (vehicle speed)<deceleration<DTH (vehicle speed)

5) Damper

Sdpref–dpdfi (steering angle, vehicle speed, deceleration)=Ref. Level of Index (steering angle, vehicle speed, deceleration)*Fdp (=1.2, 1.5: warning, alarm) in Index of LPF damping vibration [car body vibration knuckle vibration] FFT Spectrum (steering angle, vehicle speed, deceleration) on damper defect frequency (dpdfi) at STRL<steering angle<STRH, VLL (steering angle)<vehicle speed<VLH (steering angle), and ADL (steering angle, vehicle speed)<deceleration<ADH (steering angle, vehicle speed)

6) Timing Belt

Stbref–tbdfi (engine RPM, vehicle speed, accelerator pedal angle)=Ref. Level of Index (engine RPM, vehicle speed, accelerator pedal angle)*Ftb (1.2, 1.5: warning, alarm) in Index of BPF engine vibration FFT Spectrum (engine RPM, vehicle speed, accelerator pedal angle) on timing belt defect frequency(tbdfi) at RPMNL<engine RPM<RPMNH, VNL (engine RPM)<vehicle speed<VNH (engine RPM), and ATL (engine RPM, vehicle speed)<accelerator pedal angle<ATH (engine RPM, vehicle speed)

7) Wheel Alignment

Swaref–wadfi (vehicle speed)=Ref Level of Index (vehicle speed)*Fwa (=1.2, 1.5: warning, alarm) in Index of LPF transverse vibration of wheel FFT Spectrum (vehicle speed) on wheel alignment defect frequency(wadfi) at VNL<vehicle speed<VNH In an embodiment, when a precise diagnosis index repeatedly exceeds the second safety standards for a specific number of continuous specific periods, the precise diagnosis performance module 324 can determine that there is a defect in an abnormal safety part. The predetermined number 'n' (n is a natural number) may be set in advance or automatically in the apparatus 130 for providing an automotive preventive maintenance service.

Diagnosis algorithms respectively for diagnosis items may be defined as follows.

1) Driving Shaft

Index of BPF knuckle vibration Enveloping Spectrum (vehicle speed, steering angle)>Sdsref–dsdfi (vehicle speed, steering angle) & Repeat(n) on driving shaft defect frequency(dsdfi) at VNL<vehicle speed<VNH, and STL (vehicle speed)<steering angle<STH(vehicle speed)

2) Wheel Bearing

Index of BPF knuckle vibration Enveloping Spectrum (vehicle speed, accelerator pedal angle)>Swbref–wbdfi (vehicle speed, accelerator pedal angle) & Repeat(n) on wheel bearing defect frequency(wbdfi) at VNL<vehicle speed<VNH, and ATL (vehicle speed)<accelerator pedal angle<ATH (vehicle speed)

3) Wheel Unbalance

Index of LPF knuckle vibration FFT Spectrum (vehicle speed, accelerator pedal angle)>Swuref–wudfi (vehicle speed, accelerator pedal angle) & Repeat(n) on wheel unbalance defect frequency(wudfi) at VNL<vehicle speed<VNH, and ATL (vehicle speed)<accelerator pedal angle<ATH (vehicle speed)

4) Brake Judder

Index of LPF knuckle vibration FFT Spectrum (vehicle speed, deceleration)>Sjdref–jddfi (vehicle speed, deceleration) & Repeat(n) on brake judder defect frequency(jddfi) at VNL<vehicle speed<VNH, and ATL (vehicle speed)<deceleration<ATH (vehicle speed)

5) Damper

Index of LPF damping vibration damping coefficient of FFT Spectrum=[car body vibration–knuckle vibration] (steering angle, vehicle speed, deceleration)>Sdpref–dpdfi (steering angle, vehicle speed, deceleration) & Repeat(n) on damper defect frequency(dpdfi) at STRL<steering angle<STRH, VLL (steering angle)<vehicle speed<VLH (steering angle), and ADL (steering angle, vehicle speed)<deceleration<ADH (steering angle, vehicle speed)

6) Timing Belt

Index of BPF engine vibration FFT Spectrum (engine RPM, vehicle speed, accelerator pedal angle)>Stbref–tbdfi (engine RPM, vehicle speed, accelerator pedal angle) & Repeat(n) on timing belt defect frequency(tbdfi) at RPMNL<engine RPM<RPMNH, VNL (engine RPM)<vehicle speed<VNH (engine RPM), and ATL (engine RPM, vehicle speed)<accelerator pedal angle<ATH (engine RPM, vehicle speed)<accelerator pedal angle<ATH (engine RPM, vehicle speed)

7) Wheel Alignment

Index of LPF transverse vibration of wheel FFT Spectrum (vehicle speed)>Swaref (vehicle speed) & Repeat(n) on wheel alignment defect frequency (wadfi) at VNL<vehicle speed<VNH FIG. 12 is a flowchart showing an automotive breakdown generation prediction process that is performed in an apparatus for providing an automotive preventive maintenance service according to the present disclosure.

Referring to FIG. 12, the apparatus 130 for providing an automotive preventive maintenance service can summarize a vehicle state on the basis of sensing values collected for a specific period from a plurality of sensors through the vehicle state summarization module 321 (step S1210). The apparatus 130 for providing an automotive preventive maintenance service can calculate distribution about summary of a vehicle speed for a plurality of specific periods through the vehicle state distribution calculation module 322 (step S1230).

The apparatus 130 for providing an automotive preventive maintenance service can detect an abnormal safety part by determining an abnormal situation for a specific sensing value through distribution about summary of a vehicle state through the abnormal safety part detection module 323 (step S1250). The apparatus 130 for providing an automotive preventive maintenance service can perform precise diagnosis about an abnormal safety part through the precise diagnosis performance module 324 (step S1270).

Figure 13:
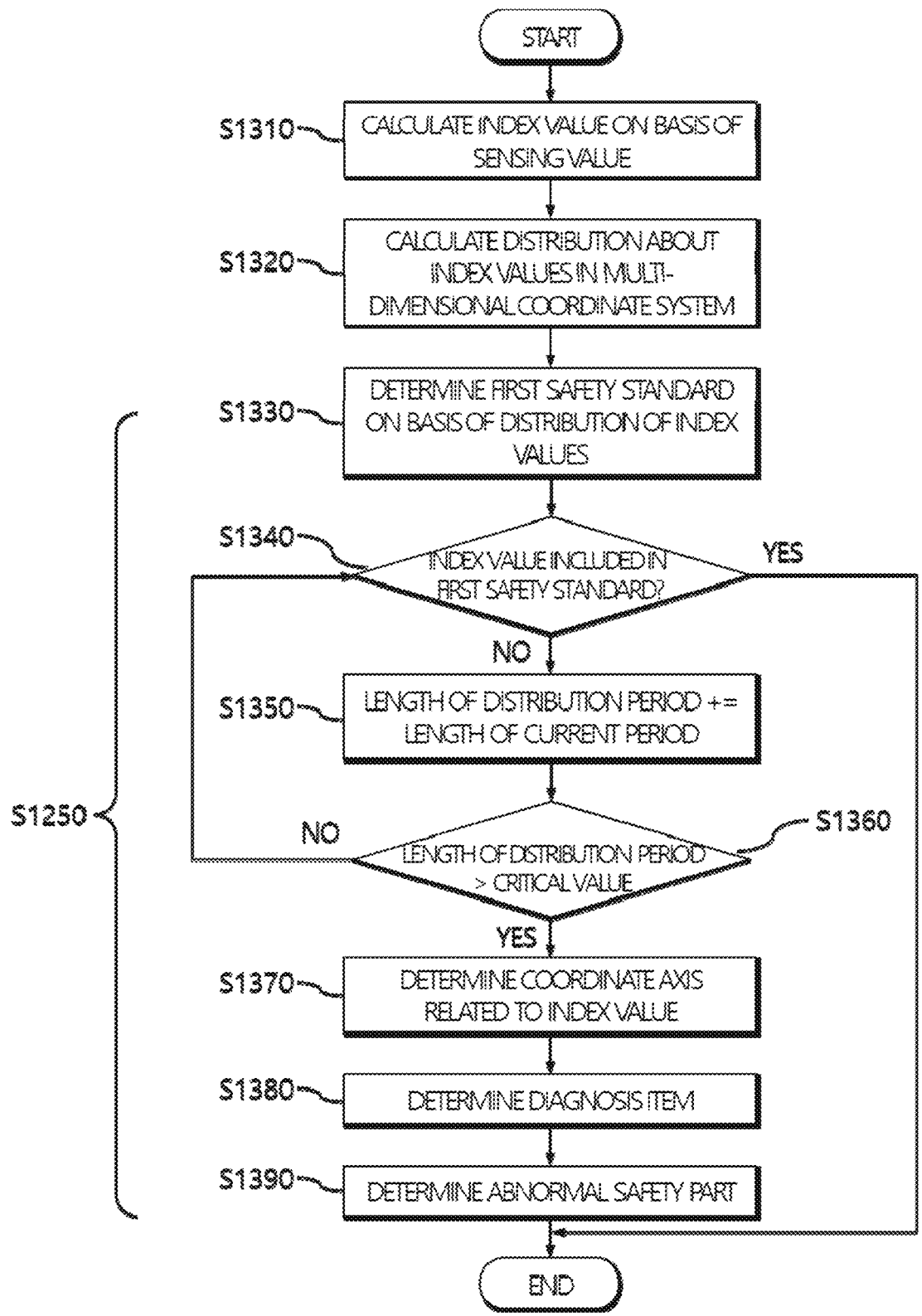
FIG. 13 is a flowchart showing an embodiment of step S1250 of FIG. 12.

FIG. 13 is a flowchart showing an embodiment of step S1250 of FIG. 12.

Referring to FIG. 13, the apparatus 130 for providing an automotive preventive maintenance service can summarize a vehicle state by calculating index value for a plurality of diagnosis items constituting the vehicle state using sensing values collected for a specific period through the vehicle state summarization module 321 (step S1310). The apparatus 130 for providing an automotive preventive maintenance service can calculate distribution about summary of a vehicle speed for a plurality of specific periods through the vehicle state distribution calculation module 322 (step S1320).

Further, the abnormal safety part detection module 323 can determine first safety standards for coordinate axes on the basis of distribution about a plurality of index values in a multi-dimensional coordinate system (step S1330). The abnormal safety part detection module 323 can store the first safety standards in the database 150.

The abnormal safety part detection module 323 can detect whether an index value related to a vehicle state, which is calculated in real time on the basis of information collected from the user vehicle 110, comes out of the first safety standards (step S1340). In this case, the index value can be created at every specific cycle and can be used as a representative value for the cycle.

The abnormal safety part detection module 323 can calculate the total length of a distribution period in which abnormality has been detected, by adding the length of the current period to the length of a previous distribution period when an index value comes out of the first safety standards (step S1350). The abnormal safety part detection module 323 can detect whether the total length of a distribution period exceeds a predetermined critical value (step S1360). When the length of the distribution period is the critical value or les, it is possible to repeatedly perform the abnormality detection step for an index value for the next period.

If the total length of a distribution exceeds the critical value, which means the case in which abnormality of an index value continuously occurs and there is a high possibility of generation of a defect, so the abnormal safety part detection module 323 can determine a coordinate axis related to the index value in a multi-dimensional coordinate system (step S1370). On the other hand, when an index value is temporarily rapidly changed due to influence by disturbance, the abnormal safety part detection module 323 sets a critical value to minimize influence on a diagnosis result, thereby being able to determine abnormality of a safety part only when the total length of a distribution period out of the first safety standards exceeds the critical value.

The critical value in this case can be set for each diagnosis item in consideration of the degree of influence on the index value by the disturbance.

The coordinate systems constituting a multi-joint coordinate system are defined to correspond to diagnosis items, respectively, so the abnormal safety part detection module 323 can determine diagnosis items respectively corresponding the coordinate axes (step S1380) and can determine the safety parts corresponding to the diagnosis items as abnormal safety parts (step S1390).

FIG. 14 is a flowchart showing an embodiment of step S1270 of FIG. 12.

Referring to FIG. 14, when an abnormal safety part is detected by the abnormal safety part detection module 323, the apparatus 130 for providing an automotive preventive maintenance service can perform precise diagnosis on the abnormal safety part through the precise diagnosis performance module 324.

In more detail, when an abnormal safety part is determined in step S1390, the precise diagnosis performance module 324 can calculate a precise diagnosis index related to the abnormal safety part (step S1410).

The precise diagnosis performance module 324 can calculate distribution about the precise diagnosis index in a multi-dimensional coordinate system (step S1420) and can determine second safety standards on the basis of distribution of the precise diagnosis index (step S1430). The precise diagnosis performance module 324 can store the second safety standards in the database 150.

On the other hand, the first safety standards and the second safety standards can be compared, as follows. First, the first safety standards are related to index values calculated on the basis of values in a time domain, but the second safety standards maybe related to precise diagnosis indexes calculated on the basis of values in a frequency domain. Second, the index values that are compared with the first safety standards are calculated at every first cycle, but the precise diagnosis indexes that are compared with the second safety standards may be calculated at every second cycle longer than the first cycle. Third, the first sampling cycle of sensing values that are used to calculate index values may be set with a cycle longer than the second sampling cycle of sensing values that are used to calculate precise diagnosis indexes. That is, index values are calculated as sensing values sampled at a high frequency, but precise diagnosis indexes may be calculated as sensing values sampled at a high frequency.

The precise diagnosis performance module 324 can detect whether a precise diagnosis index, which is calculated in real time on the basis of information collected from the user vehicle 110, comes out of the second safety standards (step S1440). In this case, the precise diagnosis index can be created at every specific cycle and can be used as a representative value for the cycle.

The precise diagnosis performance module 324 can calculate the total length of a distribution period in which abnormality has been detected, by adding the length of the current period to the length of a previous distribution period when the precise diagnosis index comes out of the first safety standards (step S1450). The precise diagnosis performance module 324 can detect whether the total length of a distribution period exceeds a predetermined critical value (step S1460). When the length of the distribution period is the critical value or les, it is possible to repeatedly perform the abnormality detection step for a precise diagnosis index for the next period.

If the total length of the distribution period exceeds the critical value, which is a case in which abnormality of a precise diagnosis index is continuously generated and which means that there is a high possibility of generation of a defect, so the precise diagnosis performance module 324 can diagnosis a defect about the corresponding abnormal safety part (step S1470).

Meanwhile, the apparatus 130 for providing an automotive preventive maintenance service can delete all the index values and the data used to calculate precise diagnosis indexes in the first and second periods set in advance in order to reduce the amount of data that is stored in memories or transmitted through communication. Accordingly, only representative values showing the characteristics (e.g., the index values and precise diagnosis indexes in each period) remain in the data before the first and second periods, and the representative values can be transmitted through communication.

Further, the precise diagnosis indexes with a lot of data to be stored/transmitted and the second safety standards are calculated with a very long cycle in comparison to the first safety standards, so the amount of data to be stored/transmitted can be reduced.

Further, when abnormality is found out in related diagnosis items on the basis of index values and the first safety standards, precise diagnosis indexes and the second safety standards are calculated regardless of the first safety standards, so it is possible to improve accuracy in diagnosis and reduce consumption of memory resources for calculating the precise diagnosis index and the second safety standards.

Further, only representative values that can show the tendency of data are stored rather than storing/transmitting all data for diagnosis items, whereby it is possible to reduce the amount of data stored in memories or reduce the amount of data that are transmitted through communication.

The present disclosure can have the following effects. However, a specific embodiment is not intended to have to include all of the following effects or only the following effects, so the scope of a right of the present disclosure should not be construed as being limited by the embodiment.

An apparatus for providing an automotive preventive maintenance service according to an embodiment of the present disclosure creates a current state of a vehicle and vehicle state information and finds out a vehicle part state, thereby being able to predict breakdown generation in the vehicle.

The apparatus for providing an automotive preventive maintenance service according to an embodiment of the present disclosure can recommend an automotive repair shop on the basis of a preventive maintenance emergency degree in accordance with a vehicle part state.

The apparatus for providing an automotive preventive maintenance service according to an embodiment of the present disclosure can provide a preventive maintenance bonus in accordance with whether to perform maintenance at an automotive repair shop on the basis of a preventive maintenance emergency degree according to a vehicle part state.

Although the present disclosure was described above with reference to exemplary embodiments, it should be understood that the present disclosure may be changed and modified in various ways by those skilled in the art, without departing from the spirit and scope of the present disclosure described in claims.

What is claimed is:

1. An apparatus for providing an automotive preventive maintenance service, the apparatus comprising:

a vehicle information creator that creates vehicle information including vehicle diagnosis information obtained in real time while a vehicle is driven and vehicle state information showing a current state of the vehicle;

a vehicle breakdown generation predictor that creates vehicle part states each composed of a preventive maintenance emergency degree and a vehicle part based on the vehicle information, and predicts breakdown generation of the vehicle;

an automotive repair shop recommender that recommends an automotive repair shop based on a cost or a distance based on the preventive maintenance emergency degree in at least one of the vehicle part states; and a preventive maintenance service compensator that detects whether to perform a maintenance service about a corresponding vehicle part state according to the preventive maintenance emergency degree, and provides preventive maintenance service compensation, wherein the vehicle breakdown generation predictor summarizes a vehicle state based on sensing values collected for a specific period from a plurality of sensors installed in the vehicle, calculates a distribution summary of the vehicle state for a plurality of specific periods, determines an abnormal situation about a specific sensing value of the vehicle part through the distribution summary of the vehicle state, and predicts the breakdown generation by performing diagnosis about the abnormal vehicle part, the vehicle breakdown generation predictor summarizes the vehicle state by classifying, based on measurement ranges in which the sensing values are included, the sensing values collected for the specific period for each sensor of the plurality of sensors into indexes corresponding to the measurement ranges and calculating index values for a plurality of diagnosis items constituting the vehicle state bar averaging the indexes into which the sensing values collected for the specific period are classified, creates a multi-dimensional coordinate system composed of coordinate axes respectively corresponding to the plurality of diagnosis items, and calculates distribution about a plurality of the index values for the plurality of specific periods in the multi-dimensional coordinate system, in the vehicle breakdown generation predictor, first safety standards are determined based on distribution about the index values in the multi-dimensional coordinate system and the index values in the multi-dimensional coordinate system are calculated on the basis of sensing values in a time domain at every first cycle, second standards are determined based on distribution of diagnosis indexes and the diagnosis indexes are calculated on the basis of sensing values in a frequency domain at every second cycle longer than the first cycle, a first sampling cycle of the sensing values for calculating the index values is longer than a second sampling cycle of the sensing values for calculating the diagnosis indexes, and the vehicle information creator, the vehicle breakdown generation predictor, the automotive repair shop recommender, and the preventative maintenance service compensator are each implemented via at least one processor.

2. The apparatus of claim 1, wherein the vehicle information creator creates the vehicle diagnosis information by diagnosing the vehicle part based on a complex vibration signal received from a vehicle vibration sensor, and takes a vehicle state received from a vehicle ECU (Electronic Control Unit) as the vehicle state information.

3. The apparatus of claim 2, wherein the vehicle information creator diagnoses the vehicle part by specifying one of at least one vehicle part related to the vehicle vibration sensor based on a frequency band of the complex vibration signal.

4. The apparatus of claim 1, wherein the vehicle breakdown generation predictor detects first abnormality of the vehicle part from the vehicle state information.

5. The apparatus of claim 4, wherein when abnormality of the vehicle part is not detected, the vehicle breakdown generation predictor determines the preventive maintenance emergency degree by estimating the state of the vehicle part from the vehicle diagnosis information.

6. The apparatus of claim 5, wherein the vehicle breakdown generation predictor determines an aging degree of the vehicle part in accordance with the state of the vehicle part, and determines the preventive maintenance emergency degree based on an aging degree to a lifespan cycle of the vehicle part.

7. The apparatus of claim 5, wherein the vehicle breakdown generation predictor determines the preventive maintenance emergency degree by determining a vibration abnormality degree of the vehicle part in accordance with the state of the vehicle part.

8. The apparatus of claim 1, wherein the vehicle breakdown generation predictor determines first safety standards for the coordinate axes based on the distribution about the index values in the multi-dimensional coordinate system, and when there is one of the index values being out of the first safety standards or index values related to the coordinate axis and being out of the first safety standards are distributed in a predetermined number of continuous specific periods, the vehicle breakdown generation predictor determines a vehicle part related to a diagnosis item corresponding to the coordinate axis as the abnormal vehicle part.

9. The apparatus of claim 8, wherein the vehicle breakdown generation predictor calculates a diagnosis index through any one of envelope analysis and FFT (Fast Fourier Transform) on the basis of sensing values collected for the specific period for the sensors related to the abnormal vehicle part, determines second safety standards based on the diagnosis index for the plurality of specific periods, and diagnoses a defect of the abnormal vehicle part when the diagnosis index repeatedly exceeds the second safety standards for a specific number of continuous specific periods by comparing the second safety standards with the diagnosis index.

10. A method of providing an automotive preventive maintenance service, the method comprising:
creating vehicle information including vehicle diagnosis information obtained in real time while a vehicle is driven and vehicle state information showing a current state of the vehicle;
creating vehicle part states each composed of a preventive maintenance emergency degree and a vehicle part based on the vehicle information, and predicting breakdown generation of the vehicle;
recommending an automotive repair shop based on a cost or a distance based on the preventive maintenance emergency degree in at least one of the vehicle part states;
detecting whether to perform a maintenance service about a corresponding vehicle part state according to the preventive maintenance emergency degree, and providing preventive maintenance service compensation;
summarizing a vehicle state on the basis of sensing values collected for a specific period from a plurality of sensors installed in the vehicle, calculating a distribution summary of a vehicle state for a plurality of specific periods, determining an abnormal situation about a specific sensing value of the vehicle part through the distribution summary of the vehicle state, and predicting the breakdown generation by performing diagnosis about the abnormal vehicle part; and
summarizing the vehicle state by classifying, based on measurement ranges in which the sensing values are included, the sensing values collected for the specific period for each sensor of the plurality of sensors into indexes corresponding to the measurement ranges and calculating index values for a plurality of diagnosis items constituting the vehicle state by averaging the indexes into which the sensing values collected for the specific period are classified, creating a multi-dimensional coordinate system composed of coordinate axes respectively corresponding to the plurality of diagnosis items, and calculating distribution about a plurality of the index values for the plurality of specific periods in the multi-dimensional coordinate system, wherein
first safety standards are determined based on distribution about the index values in the multi-dimensional coordinate system and the index values in the multi-dimensional coordinate system are calculated on the basis of sensing values in a time domain at every first cycle,
second standards are determined based on distribution of diagnosis indexes and the diagnosis indexes are calculated on the basis of sensing values in a frequency domain at every second cycle longer than the first cycle, and
a first sampling cycle of the sensing values for calculating the index values is longer than a second sampling cycle of the sensing values for calculating the diagnosis indexes.

11. A non-transitory computer-readable medium having embodied thereon a program, which when executed by a computer causes the computer to execute a method of providing an automotive preventive maintenance service, the method comprising:
creating vehicle information including vehicle diagnosis information obtained in real time while a vehicle is driven and vehicle state information showing a current state of the vehicle;
creating vehicle part states each composed of a preventive maintenance emergency degree and a vehicle part based on the vehicle information, and predicting breakdown generation of the vehicle;
recommending an automotive repair shop based on a cost or a distance based on the preventive maintenance emergency degree in at least one of the vehicle part states;
detecting whether to perform a maintenance service about a corresponding vehicle part state according to the preventive maintenance emergency degree, and providing preventive maintenance service compensation;
summarizing a vehicle state on the basis of sensing values collected for a specific period from a plurality of sensors installed in the vehicle, calculating a distribution summary of the vehicle state for a plurality of specific periods, determining an abnormal situation about a specific sensing value of the vehicle part through the distribution summary of the vehicle state, and predicting the breakdown generation by performing diagnosis about the abnormal vehicle part; and summarizing the vehicle state by classifying, based on measurement ranges in which the sensing values are included, the sensing values collected for the specific period for each sensor of the plurality of sensors into indexes corresponding to the measurement ranges and calculating index values for a plurality of diagnosis items constituting the vehicle state by averaging the indexes into which the sensing values collected for the specific period are classified, creating a multi-dimensional coordinate system composed of coordinate axes respectively corresponding to the plurality of diagnosis items, and calculating distribution about a plurality of the index values for the plurality of specific periods in the multi-dimensional coordinate system, wherein first safety standards are determined based on distribution about the index values in the multi-dimensional coordinate system and the index values in the multi-dimensional coordinate system are calculated on the basis of sensing values in a time domain at every first cycle, second standards are determined based on distribution of diagnosis indexes and the diagnosis indexes are calculated on the basis of sensing values in a frequency domain at every second cycle longer than the first cycle, and a first sampling cycle of the sensing values for calculating the index values is longer than a second sampling cycle of the sensing values for calculating the diagnosis indexes.

* * * * *